United States Patent
Menon et al.

(10) Patent No.: US 12,514,702 B2
(45) Date of Patent: Jan. 6, 2026

(54) MECHANICAL GUIDES FOR CONTROLLING LEAFLET FOLDING BEHAVIOR DURING CRIMPING

(71) Applicant: Medtronic, Inc., Minneapolis, MN (US)

(72) Inventors: Grant Menon, Costa Mesa, CA (US); Yogesh Darekar, Irvine, CA (US); George Hallak, Irvine, CA (US)

(73) Assignee: MEDTRONIC, INC., Minneapolis, MN (US)

( * ) Notice: Subject to any disclaimer, the term of this patent is extended or adjusted under 35 U.S.C. 154(b) by 221 days.

(21) Appl. No.: 17/518,061

(22) Filed: Nov. 3, 2021

(65) Prior Publication Data
US 2022/0142771 A1    May 12, 2022

Related U.S. Application Data
(60) Provisional application No. 63/111,246, filed on Nov. 9, 2020.

(51) Int. Cl.
*A61F 2/24*    (2006.01)

(52) U.S. Cl.
CPC ............ *A61F 2/243* (2013.01); *A61F 2/2418* (2013.01); *A61F 2/2427* (2013.01); *A61F 2/2466* (2013.01)

(58) Field of Classification Search
CPC .... A61F 2/9522; A61F 2/9524; A61F 2/9525; A61F 2/9526; A61F 2/2439; A61F 2/2427; A61F 2/243; A61F 2/95; A61F 2/2466; A61F 2002/9511
See application file for complete search history.

(56) References Cited

U.S. PATENT DOCUMENTS
| | | | |
|---|---|---|---|
| 4,553,545 A | * | 11/1985 | Maass .................. A61F 2/0105 267/167 |
| 5,810,873 A | | 9/1998 | Morales |
| 8,608,770 B2 | | 12/2013 | Forster et al. |
| (Continued) | | | |

FOREIGN PATENT DOCUMENTS
| | | | | |
|---|---|---|---|---|
| WO | 2006123046 A1 | | 11/2006 | |
| WO | WO-2010130297 A1 | * | 11/2010 | ........... A61F 2/2436 |

OTHER PUBLICATIONS
European Search Report issued Mar. 11, 2022 in EP Appl. No. 21 206 950.4.

*Primary Examiner* — Dinah Baria
(74) *Attorney, Agent, or Firm* — MEDLER FERRO WOODHOUSE & MILLS PLLC

(57) ABSTRACT

An assembly including a transcatheter valve prosthesis and a leaflet folding accessory configured for use when compressing the transcatheter valve prosthesis into the crimped configuration. The transcatheter valve prosthesis includes a stent and a prosthetic valve component including at least one leaflet disposed within and secured to the stent. The transcatheter valve prosthesis has a crimped configuration for delivery within a vasculature and an expanded configuration for deployment within a native heart valve. The leaflet folding accessory includes a plurality of guide fingers. Each guide finger is configured to contact the prosthetic valve component and hold the at least one leaflet in a predetermined configuration when the transcatheter valve prosthesis is compressed into the crimped configuration.

15 Claims, 15 Drawing Sheets

(56) References Cited

U.S. PATENT DOCUMENTS

| | | | |
|---|---|---|---|
| 9,265,607 B2 | 2/2016 | Glazier | |
| 9,757,232 B2 | 9/2017 | Peterson et al. | |
| 10,973,631 B2 | 4/2021 | Scheinblum et al. | |
| 11,109,968 B2 | 9/2021 | Gale et al. | |
| 2008/0154355 A1 | 6/2008 | Benichou et al. | |
| 2009/0132035 A1* | 5/2009 | Roth | A61F 2/2415 |
| | | | 623/2.14 |
| 2009/0299449 A1* | 12/2009 | Styrc | A61F 2/95 |
| | | | 623/1.11 |
| 2013/0261742 A1* | 10/2013 | Gaschino | A61F 2/0095 |
| | | | 623/2.11 |
| 2014/0277364 A1* | 9/2014 | Sarac | A61F 2/9525 |
| | | | 623/1.12 |
| 2014/0277574 A1 | 9/2014 | Liljegren et al. | |
| 2015/0105849 A1* | 4/2015 | Cohen | A61F 2/9524 |
| | | | 623/1.12 |
| 2015/0336150 A1* | 11/2015 | Peterson | A61F 2/2418 |
| | | | 72/429 |
| 2018/0133000 A1* | 5/2018 | Scheinblum | A61F 2/2412 |
| 2018/0344490 A1* | 12/2018 | Fox | B23P 19/02 |

\* cited by examiner

MECHANICAL GUIDES FOR CONTROLLING LEAFLET FOLDING BEHAVIOR DURING CRIMPING

CROSS-REFERENCE TO RELATED APPLICATIONS

This application claims the benefit of U.S. Provisional Patent Application Ser. No. 63/111,246, filed Nov. 9, 2020, which is hereby incorporated by reference in its entirety for all purposes.

FIELD

The present technology is generally related to prosthetic valve devices, and in particular is directed to a leaflet folding accessory for use when radially compressing the prosthetic valve device into a crimped configuration.

BACKGROUND

The human heart is a four chambered, muscular organ that provides blood circulation through the body during a cardiac cycle. The four main chambers include the right atrium and right ventricle which supplies the pulmonary circulation, and the left atrium and left ventricle which supplies oxygenated blood received from the lungs into systemic circulation. To ensure that blood flows in one direction through the heart, atrioventricular valves (tricuspid and mitral valves) are present between the junctions of the atrium and the ventricles, and semi-lunar valves (pulmonary valve and aortic valve) govern the exits of the ventricles leading to the lungs and the rest of the body. These valves contain leaflets or cusps that open and shut in response to blood pressure changes caused by the contraction and relaxation of the heart chambers. The valve leaflets move apart from each other to open and allow blood to flow downstream of the valve, and coapt to close and prevent backflow or regurgitation in an upstream manner.

Diseases associated with heart valves, such as those caused by damage or a defect, can include stenosis and valvular insufficiency or regurgitation. For example, valvular stenosis causes the valve to become narrowed and hardened which can prevent blood flow to a downstream heart chamber from occurring at the proper flow rate and may cause the heart to work harder to pump the blood through the diseased valve. Valvular insufficiency or regurgitation occurs when the valve does not close completely, allowing blood to flow backwards, thereby causing the heart to be less efficient. A diseased or damaged valve, which can be congenital, age-related, drug-induced, or in some instances, caused by infection, can result in an enlarged, thickened heart that loses elasticity and efficiency. Some symptoms of heart valve diseases can include weakness, shortness of breath, dizziness, fainting, palpitations, anemia and edema, and blood clots which can increase the likelihood of stroke or pulmonary embolism. Symptoms can often be severe enough to be debilitating and/or life threatening.

Heart valve prostheses have been developed for repair and replacement of diseased and/or damaged heart valves. Such heart valve prostheses can be percutaneously delivered and deployed at the site of the diseased heart valve through catheter-based delivery systems. Such heart valve prostheses are delivered in a radially compressed or crimped configuration so that the heart valve prosthesis can be advanced through the patient's vasculature. Once positioned at the treatment site, the heart valve prosthesis is expanded to engage tissue at the diseased heart valve region to, for instance, hold the heart valve prosthesis in position.

The present disclosure relates to improvements in radially compressing or crimping a heart valve prosthesis to ensure that the heart valve prosthesis has a low profile for transcatheter delivery through a patient's vasculature and further to ensure that the leaflets of the heart valve prosthesis are not damaged during crimping.

SUMMARY

According to a first embodiment hereof, the present disclosure provides an assembly including a transcatheter valve prosthesis and a leaflet folding accessory configured for use when compressing the transcatheter valve prosthesis into the crimped configuration. The transcatheter valve prosthesis includes a stent and a prosthetic valve component including at least one leaflet disposed within and secured to the stent. The transcatheter valve prosthesis has a crimped configuration for delivery within a vasculature and an expanded configuration for deployment within a native heart valve. The leaflet folding accessory includes a plurality of guide fingers, each guide finger having a first end and a second end. The second end of each guide finger is configured to contact the prosthetic valve component and hold the at least one leaflet in a closed state against an inner shaft of a delivery system when the transcatheter valve prosthesis is radially compressed into the crimped configuration.

In an aspect of the first embodiment, and in combination with any other aspects herein, the disclosure provides the second end of each guide finger includes a semi-spherical tip that is configured to contact the prosthetic valve component.

In an aspect of the first embodiment, and in combination with any other aspects herein, the disclosure provides each guide finger is formed of a pliable polymer material.

In an aspect of the first embodiment, and in combination with any other aspects herein, the disclosure provides the second end of each guide finger includes a coating that increases friction between the tip and the prosthetic valve component. In an embodiment, the coating is selected from silicone, PTFE, and polyurethane.

In an aspect of the first embodiment, and in combination with any other aspects herein, the disclosure provides the plurality of guide fingers include at least three guide fingers.

In an aspect of the first embodiment, and in combination with any other aspects herein, the disclosure provides the plurality of guide fingers do not include more than nine guide fingers.

In an aspect of the first embodiment, and in combination with any other aspects herein, the disclosure provides the plurality of guide fingers include exactly three guide fingers and the at least one leaflet includes exactly three leaflets, with each guide finger being configured to contact a single leaflet.

In an aspect of the first embodiment, and in combination with any other aspects herein, the disclosure provides the plurality of guide fingers are circumferentially spaced apart from each other at substantially equal intervals.

In an aspect of the first embodiment, and in combination with any other aspects herein, the disclosure provides the leaflet folding accessory includes a hub configured to be held by a user, the hub being attached at the first end of each guide finger. In an embodiment, each guide finger extends axially and radially inwards from the hub along an entire length thereof. In another embodiment, each guide finger includes a first portion that extends from the hub axially and substantially parallel to a longitudinal axis of the transcatheter valve prosthesis, a second portion that extends axially and substantially parallel to the longitudinal axis of the transcatheter valve prosthesis, and a third portion that extends between the first portion and the second portion, the third portion extending axially and radially inwards from the first portion to the second portion. In another embodiment, each guide finger extends axially and radially outwards from the hub along an entire length thereof and the hub includes an inner sleeve and an outer sleeve, the outer sleeve being slideable relative to the inner sleeve in order to adjust a radial position of the second ends of the guide fingers.

In an aspect of the first embodiment, and in combination with any other aspects herein, the disclosure provides the leaflet folding accessory includes a hub configured to be held by a user, the hub being attached at the first end of each guide finger. In an embodiment, the hub is configured to attach to a loading tray.

According to a second embodiment hereof, the present disclosure provides a method of crimping a transcatheter valve prosthesis onto a delivery system. A transcatheter valve prosthesis is positioned onto an inner shaft of a delivery system, with the transcatheter valve prosthesis being in an expanded configuration. The transcatheter valve prosthesis includes a stent and a prosthetic valve component including at least one leaflet disposed within and secured to the stent. A crimper is positioned over the transcatheter valve prosthesis in the expanded configuration. A leaflet folding accessory is positioned at least partially within the transcatheter valve prosthesis in the expanded configuration. The leaflet folding accessory includes a plurality of guide fingers, each guide finger having a first end and a second end. The leaflet folding accessory is positioned such that the second end of each guide finger contacts the prosthetic valve component and holds the at least one leaflet in a closed state against the inner shaft of the delivery system. The crimper is operated to radially compress the transcatheter valve prosthesis into a crimped configuration for delivery within a vasculature. During operation of the crimper, the leaflet folding accessory remains positioned such that the second end of each guide finger contacts the prosthetic valve component and holds the at least one leaflet in the closed state. The leaflet folding accessory is removed from within the transcatheter valve prosthesis.

In an aspect of the second embodiment, and in combination with any other aspects herein, the disclosure provides advancing an outer shaft of the delivery system over the transcatheter valve prosthesis in the crimped configuration after the step of removing the leaflet folding accessory, and removing the crimper.

According to a third embodiment hereof, the present disclosure provides an assembly including a transcatheter valve prosthesis and a leaflet folding accessory configured for use when compressing the transcatheter valve prosthesis into a crimped configuration. The transcatheter valve prosthesis includes a stent and a prosthetic valve component including at least one leaflet disposed within and secured to the stent. The transcatheter valve prosthesis has a crimped configuration for delivery within a vasculature and an expanded configuration for deployment within a native heart valve. The leaflet folding accessory includes a plurality of guide fingers. At least a portion of each guide finger is configured to contact an inner surface of the prosthetic valve component and hold the at least one leaflet in an open state against an inner surface of the stent of the transcatheter valve prosthesis when the transcatheter valve prosthesis is radially compressed into the crimped configuration.

In an aspect of the third embodiment, and in combination with any other aspects herein, the disclosure provides the plurality of guide fingers include at least three guide fingers.

In an aspect of the third embodiment, and in combination with any other aspects herein, the disclosure provides the plurality of guide fingers do not include more than nine guide fingers.

In an aspect of the third embodiment, and in combination with any other aspects herein, the disclosure provides the plurality of guide fingers include exactly nine guide fingers and the at least one leaflet includes exactly three leaflets, with three guide fingers being configured to contact a single leaflet.

In an aspect of the third embodiment, and in combination with any other aspects herein, the disclosure provides the plurality of guide fingers are circumferentially spaced apart from each other at substantially equal intervals.

In an aspect of the third embodiment, and in combination with any other aspects herein, the disclosure provides the leaflet folding accessory includes a hub configured to be held by a user, the hub being attached at the first end of each guide finger. In an embodiment, each guide finger extends axially and radially outwards from the hub along an entire length thereof. In another embodiment, each guide finger includes a first portion that extends from the hub axially and substantially parallel to a longitudinal axis of the transcatheter valve prosthesis, a second portion that extends axially and substantially parallel to the longitudinal axis of the transcatheter valve prosthesis, and a third portion that extends between the first portion and the second portion, the third portion extending axially and radially outwards from the first portion to the second portion.

In an aspect of the third embodiment, and in combination with any other aspects herein, the disclosure provides the leaflet folding accessory includes a hub configured to be held by a user, the hub being attached at the first end of each guide finger. In an embodiment, the hub is configured to attach to a loading tray.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Figure 1:
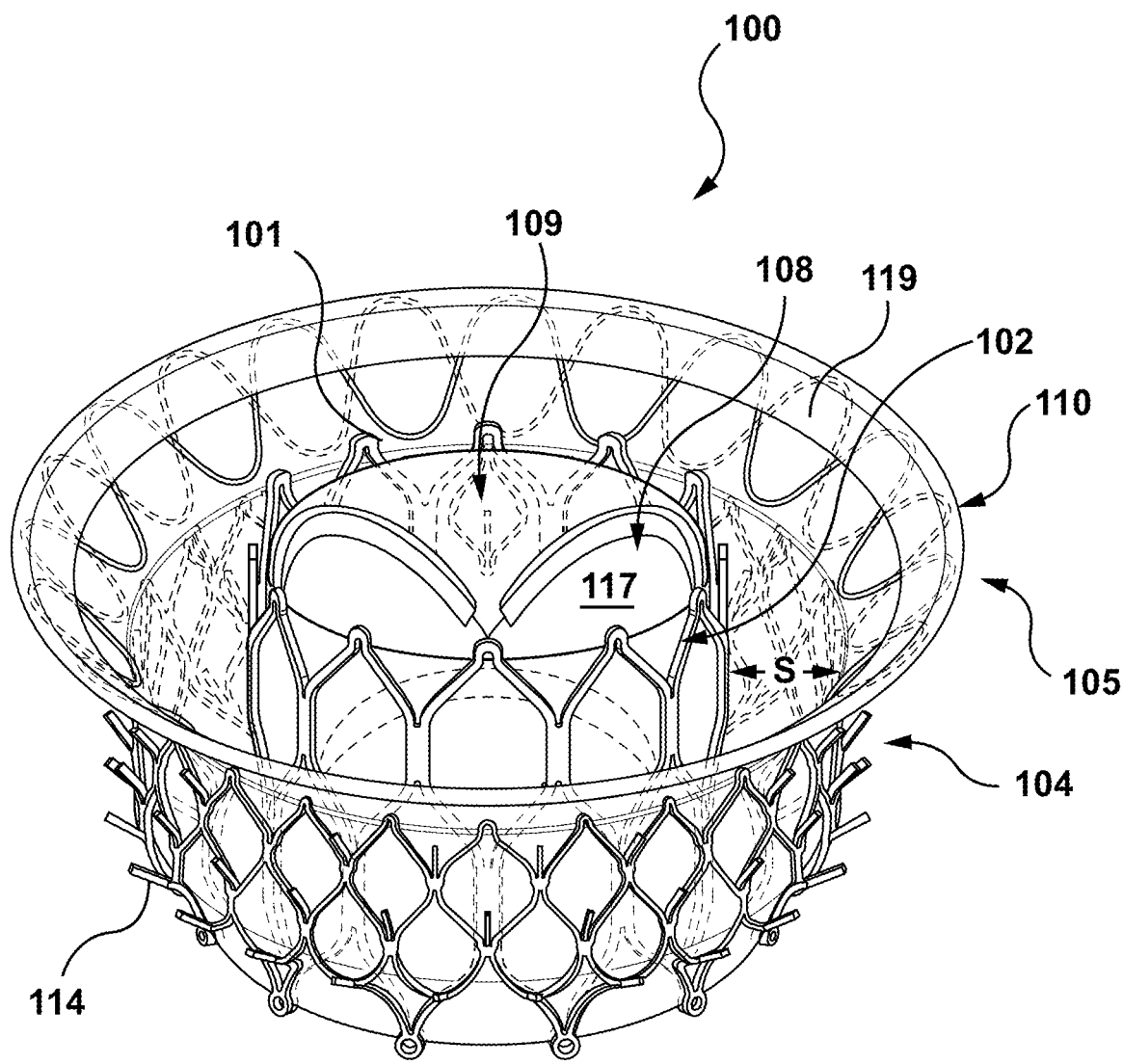
FIG. 1 depicts a perspective view of a transcatheter heart valve prosthesis in accordance with an aspect of the disclosure.

Specific embodiments of the present invention are now described with reference to the figures, wherein like reference numbers indicate identical or functionally similar elements. The terms "distal" and "proximal", when used in the following description to refer to a native vessel, native valve, or a device to be implanted into a native vessel or native valve, such as a transcatheter heart valve prosthesis, are with reference to the direction of blood flow. Thus, "distal" and "distally" refer to positions in a downstream direction with respect to the direction of blood flow and the terms "proximal" and "proximally" refer to positions in an upstream direction with respect to the direction of blood flow.

Embodiments hereof relate to a leaflet folding accessory or tool configured for use with a transcatheter valve prosthesis when radially compressing the transcatheter valve prosthesis into a crimped configuration for delivery within a vasculature. The folding pattern of the leaflets when the transcatheter valve prosthesis is in the crimped configuration determines the distribution of stresses and strains in the leaflets. During crimping of a transcatheter valve prosthesis, the crimping may cause leaflet damage and the leaflets may fold into an irregular pattern that adversely affects the profile of the transcatheter valve prosthesis in the crimped configuration. Embodiments of the leaflet folding accessory described herein are configured to hold the leaflets of a prosthetic valve component of the transcatheter valve prosthesis in a pre-determined state or configuration during crimping. Embodiments of the leaflet folding accessory described herein include a plurality of flexible guide fingers made of a soft, atraumatic material that are configured to contact the leaflets and hold them in a pre-determined state during crimping, thereby preventing undesirable folding and/or damage to the leaflets during crimping. By being held in a pre-determined state during crimping, the leaflets fold in a pre-determined and desirable pattern which results in a smaller delivery profile of the transcatheter valve prosthesis for delivery. Stated another way, the leaflet folding accessories described herein increase the packing efficiency of the prosthetic valve component and thereby decrease the size of the delivery system required to constrain the transcatheter valve prosthesis in its crimped configuration. The leaflet folding accessory tool is removed after the transcatheter valve prosthesis is crimped but before the transcatheter valve prosthesis is fully encapsulated within a delivery system for delivery within a vasculature.

FIGS. 1-4 illustrate a transcatheter heart valve prosthesis 100 that may be utilized with the embodiments of the leaflet folding accessory described herein. The heart valve prosthesis 100 is illustrated herein in order to facilitate description of the present invention. The following description of the transcatheter heart valve prosthesis 100 is merely exemplary in nature and is not intended to limit the invention or the application and uses of the invention. It is understood that any number of alternate heart valve prostheses can be used with the leaflet accessory tools and methods described herein. Other non-limiting examples of transcatheter heart valve prostheses that can be used with the leaflet accessory tools described herein are described in U.S. application Ser. No. 16/853,851 to McVeigh et al., U.S. Pat. No. 9,034,032 to McLean et al. and International Patent Application No. PCT/US2014/029549 to McLean et al, U.S. Patent Application Publication No. 2012/0101572 to Kovalsky et al., U.S. Patent Application Publication No. 2012/0035722 to Tuval, U.S. Patent Application Publication No. 2006/0265056 to Nguyen et al., U.S. Patent Application Publication No. 2007/05409266 to Birdsall, and U.S. Patent Application Publication No. 2007/05409269 to Dolan et al., each of which is incorporated by reference herein in its entirety. Although the transcatheter heart valve prosthesis 100 is a heart valve prosthesis configured for placement within a mitral heart valve, embodiments of the leaflet folding accessory described herein may be utilized with any transcatheter valve prosthesis that is crimped onto a delivery system. For example, embodiments of the leaflet folding accessory described herein may be utilized with a transcatheter heart valve configured for placement within a pulmonary, aortic, mitral, or tricuspid valve, or may be utilized with a transcatheter valve prosthesis configured for placement within a venous valve or within other body passageways where it is deemed useful. There is no intention to be bound by any expressed or implied theory presented in the preceding technical field, background, brief summary or the following detailed description.

A perspective view of the transcatheter heart valve prosthesis 100 in accordance with an aspect of the disclosure is shown in FIG. 1. The transcatheter heart valve prosthesis 100 is configured to be radially compressed into a reduced-diameter crimped configuration for delivery within a vasculature (not shown) and to return to an expanded, deployed configuration, as shown in FIG. 1. Stated another way, the transcatheter heart valve prosthesis 100 has a crimped configuration for delivery within a vasculature and an expanded configuration for deployment within a native heart valve. In accordance with embodiments hereof, when in the crimped configuration, the transcatheter heart valve prosthesis 100 has a low profile suitable for delivery to and deployment within a native heart valve via a suitable delivery catheter that may be tracked to the deployment site of the native heart valve of a heart via any one of a transseptal, retrograde, or transapical approach. The transcatheter heart valve prosthesis 100 includes a stent 105 and a prosthetic valve component 108 including at least one leaflet disposed within and secured to the stent 105.

Any portion of the stent 105 described herein as an element of a heart valve prosthesis 100 may be made from any number of suitable biocompatible materials, e.g., stainless steel, nickel titanium alloys such as Nitinol™, cobalt chromium alloys such as MP35N, other alloys such as ELGILOY® (Elgin, Ill.), various polymers, pyrolytic carbon, silicone, polytetrafluoroethylene (PTFE), or any number of other materials or combination of materials. A suitable biocompatible material would be selected to provide the transcatheter heart valve prosthesis 100 to be configured to be compressed into a reduced-diameter crimped configuration for transcatheter delivery to a native valve, whereby release from a delivery catheter returns the prosthesis to an expanded, deployed configuration.

In an aspect of the disclosure, the stent 105 of the transcatheter heart valve prosthesis 100 includes a valve support 102 at least partially surrounded by and coupled to an anchor element 104. The valve support 102 is a stent-like or frame structure that defines a central lumen 109 from an inflow end 101 of the valve support 102 to an outflow end 103 of the valve support 102. The valve support 102 is configured to support the prosthetic valve component 108 therein, which will be described in more detail below. In an embodiment, the valve support 102 has a substantially cylindrical shape in which the outflow end 103 of the valve support 102 has a diameter that is substantially the same as a diameter of the inflow end 101 of the valve support 102.

In an aspect of the disclosure, the anchor element 104 is a stent-like or frame structure that functions as an anchor for the transcatheter heart valve prosthesis 100 to secure its deployed position within a native annulus. The anchor element 104 is a substantially cylindrically-shaped structure that is configured to engage heart tissue at or below an annulus of a native heart valve, such as an annulus of a native mitral valve. The anchor element 104 includes one or more cleats or prongs 114 that extend outward from an exterior side thereof to engage heart tissue. In another embodiment, the anchor element 104 may employ barbs, spikes, or other tissue fixation mechanisms for engaging heart tissue.

The transcatheter heart valve prosthesis 100 further includes a brim or rim element 110 that extends outwardly from an upstream end of the anchor element 104. The brim element 110 includes overlapping, 180 degree out of phase sinusoidal wire forms that are attached and hinged to the anchor element 104 by a suitable biocompatible low-profile fabric 119 used in bioprosthetic implants namely endovascular grafts, heart valves or left atrial appendage devices to promote bio-integration, such as woven polyethylene terephthalate (PET) fabric. The brim element 110 may act as an atrial retainer, if present, and to serve such a function the brim element 110 may be configured to engage tissue above a native annulus, such as a supra-annular surface or some other tissue in the left atrium, to thereby inhibit downstream migration of a prosthetic heart valve 100, for e.g., during atrial systole.

Figure 2:
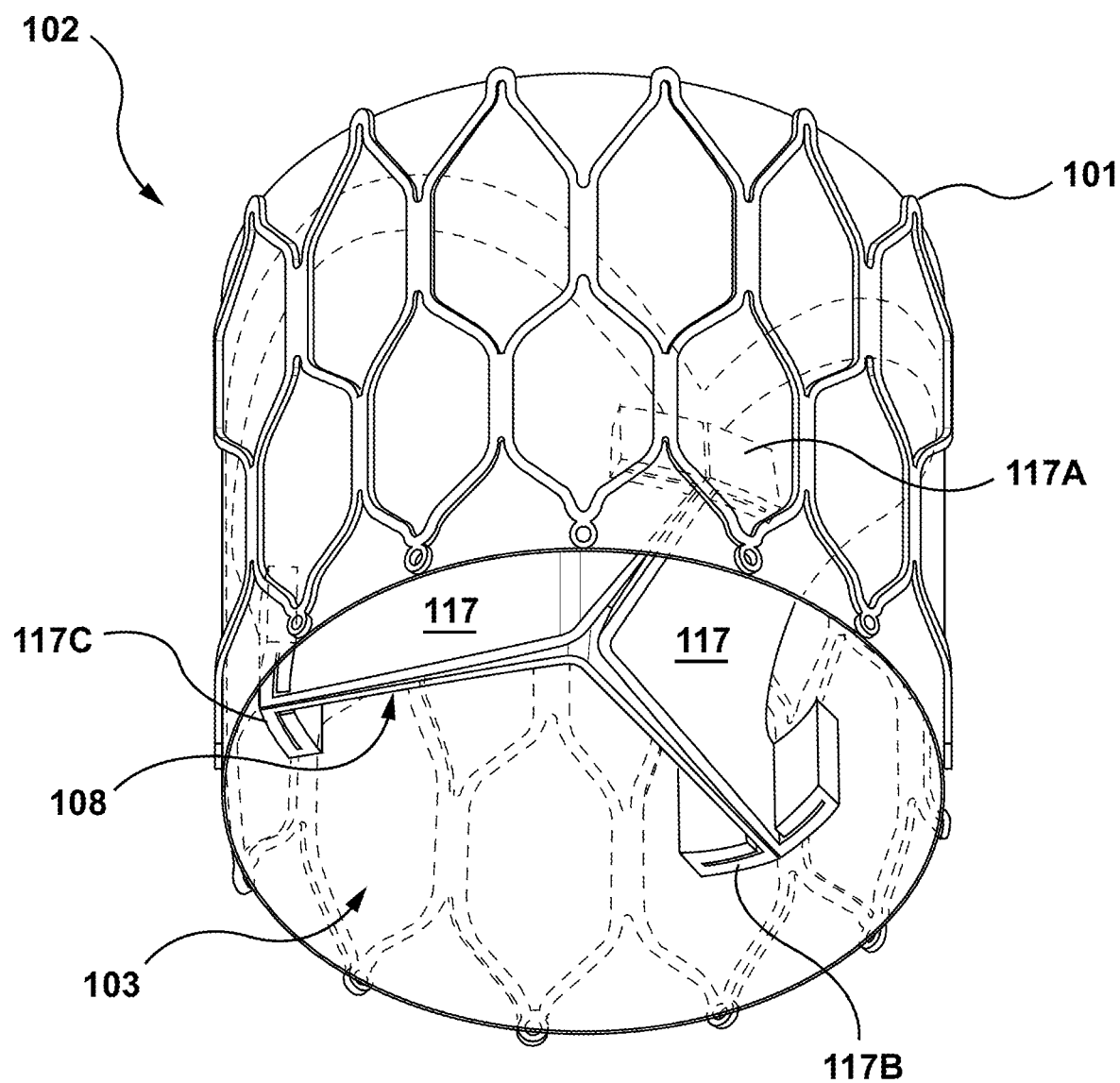
FIG. 2 depicts a perspective view of a valve support of the transcatheter heart valve prosthesis of FIG. 1 with a prosthetic valve component secured therein in accordance with an aspect of the disclosure.
Figure 4:
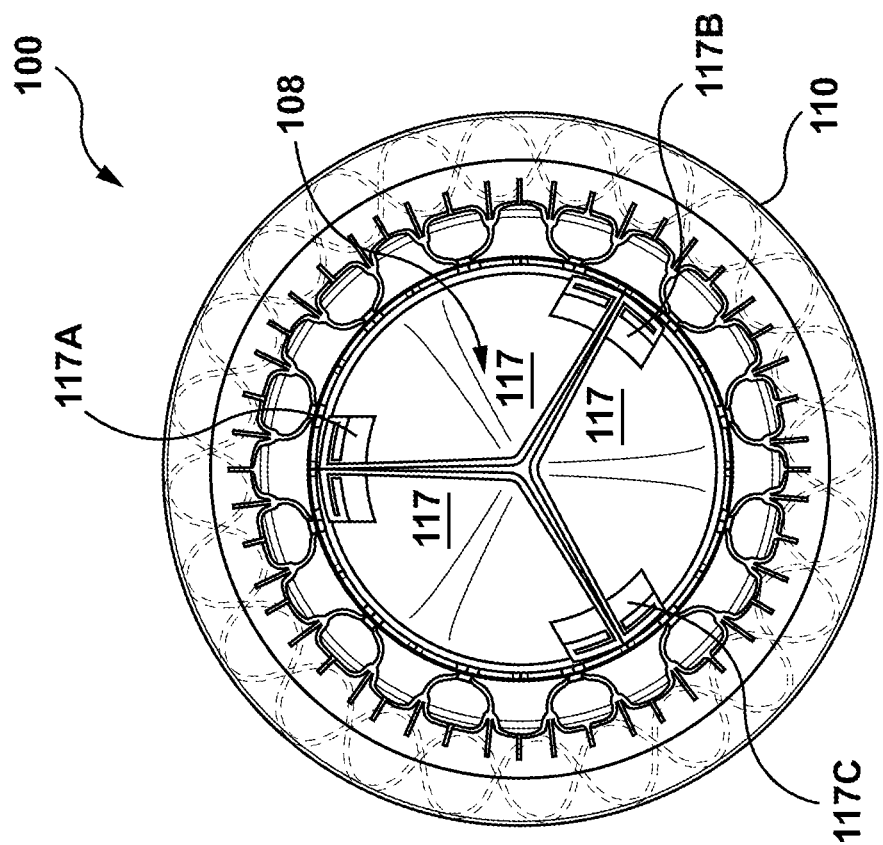
FIG. 4 depicts a ventricular end view of the transcatheter heart valve prosthesis shown in FIG. 1 in accordance with an aspect of the disclosure.
Figure 3:
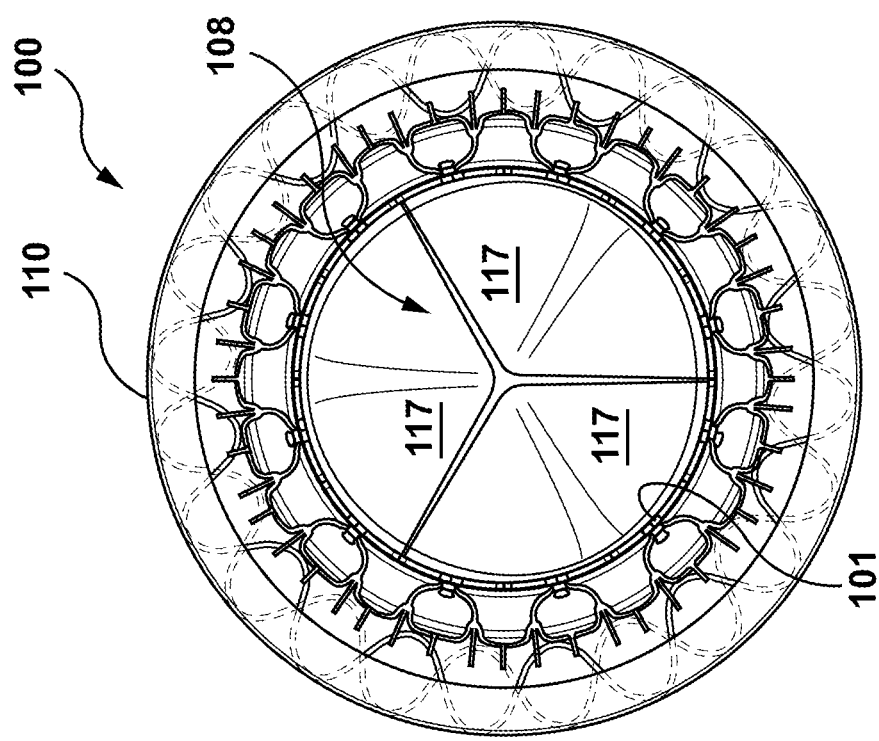
FIG. 3 depicts an atrial end view of the transcatheter heart valve prosthesis shown in FIG. 1 in accordance with an aspect of the disclosure.

The prosthetic valve component 108 of the transcatheter heart valve prosthesis 100 is capable of regulating flow therethrough via valve leaflets that may form a replacement valve. FIGS. 1-4 illustrate an exemplary prosthetic valve component having three leaflets, although a single leaflet or bicuspid leaflet configuration may alternatively be used in embodiments hereof. When deployed in situ, the prosthetic valve component 108 in a closed state is configured to block blood flow in one direction to regulate blood flow through the central lumen 109 of the valve support 102. FIG. 2 depicts a perspective view of the valve support 102 with a prosthetic valve component 108 secured therein, the valve support 102 being shown in FIG. 2 removed from the remainder of the transcatheter heart valve prosthesis 100 shown in FIG. 1 for ease of illustration. FIG. 3 depicts an atrial or inflow end view of the transcatheter heart valve prosthesis 100 shown in FIG. 1, and FIG. 4 depicts a ventricular or outflow end view of the transcatheter heart valve prosthesis 100 shown in FIG. 1. The prosthetic valve component 108 includes valve leaflets 117, e.g., three valve leaflets 117, that are disposed to coapt within an upstream portion of the valve support 102 with leaflet commissures 117A, 117B, 117C of the valve leaflets 117 being secured within a downstream portion of the valve support 102, such that the valve leaflets 117 open during diastole. Leaflets 117 are attached along their bases to the valve support 102, for example, using sutures or a suitable biocompatible adhesive. Adjoining pairs of leaflets 117 are attached to one another at their lateral ends to form leaflet commissures 117A, 117B, 117C. The orientation of the leaflets 117 within the valve support 102 depends upon on which end of the transcatheter heart valve prosthesis 100 is the inflow end and which end of the transcatheter heart valve prosthesis 100 is the outflow end, thereby ensuring one-way flow of blood through the transcatheter heart valve prosthesis 100.

The valve leaflets 117 may be formed of various flexible materials including, but not limited to natural pericardial material such as tissue from bovine, equine or porcine origins, or synthetic materials such as polytetrafluoroethylene (PTFE), DACRON® polyester, pyrolytic carbon, or other biocompatible materials. With certain prosthetic leaflet materials, it may be desirable to coat one or both sides of the replacement valve leaflet with a material that will prevent or minimize overgrowth. It is further desirable that the prosthetic leaflet material is durable and not subject to stretching, deforming, or fatigue.

For delivery, the transcatheter heart valve prosthesis 100 is radially compressed into a reduced-diameter crimped configuration onto a delivery system for delivery within a vasculature. As known in the art, the delivery system includes an inner shaft that receives the transcatheter heart valve prosthesis 100 on a distal portion thereof and an outer sheath or capsule that is configured to compressively retain the transcatheter heart valve prosthesis 100 on the distal portion of the inner shaft during delivery. Stated another way, the outer sheath or capsule surrounds and constrains the transcatheter heart valve prosthesis 100 in the radially compressed or crimped configuration. An exemplary delivery system for delivering the transcatheter heart valve prosthesis 100 is described in U.S. Pat. No. 9,034,032 to McLean et al. and International Patent Application No. PCT/US2014/029549 to McLean et al, previously incorporated by reference herein. However, it will be apparent to one of ordinary skill in the art that other delivery systems may be utilized and that the components of the delivery system may vary depending upon the configuration and structure of the transcatheter valve prosthesis that is being delivered.

With reference to FIGS. 5-8, a leaflet folding accessory 520 is a mechanical guide or tool that is configured for use with a transcatheter valve prosthesis (such as but not limited to the transcatheter heart valve prosthesis 100) when radially compressing the transcatheter valve prosthesis into a crimped configuration for delivery within a vasculature. For illustrative purposes only, the leaflet folding accessory 520 will be described for use with the transcatheter heart valve prosthesis 100 since the structure thereof has been described herein. The leaflet folding accessory 520 is configured to hold the leaflets 117 of the prosthetic valve component 108 of the transcatheter heart valve prosthesis 100 in a closed state against an inner shaft 652 of a delivery system 650 during crimping. As used herein, "a closed state against an inner shaft of a delivery system" includes the leaflets being positioned such that the free or unattached edges thereof abut against or contact the inner shaft 652 of the delivery system 650. The closed state of the leaflets against an inner shaft of a delivery system is similar to the closed state of the leaflets after deployment of the transcatheter valve prosthesis in situ (in which the leaflets are configured to block blood flow in one direction to regulate blood flow through the central lumen of the stent), except that the inner shaft of the delivery system extends through the central lumen of the stent during crimping.

Figure 5:
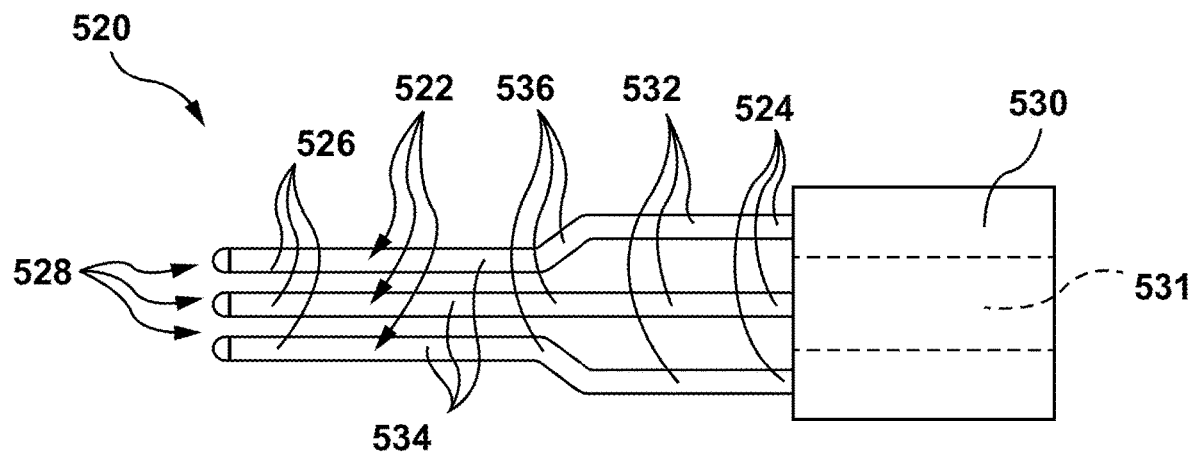
FIG. 5 depicts a side view of a leaflet folding accessory in accordance with an aspect of the disclosure.
Figure 6:
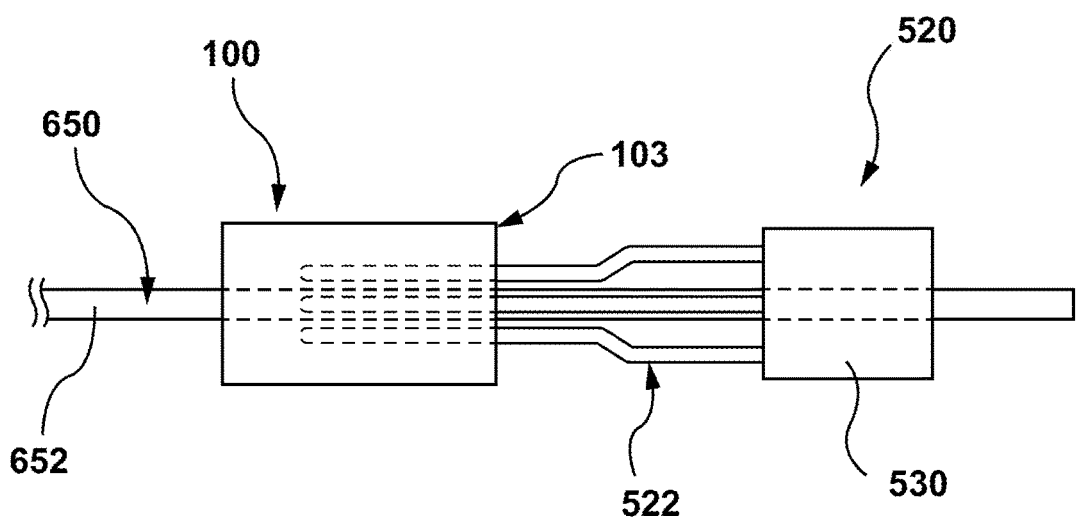
FIG. 6 depicts a side view of the relative positioning of the leaflet folding accessory of FIG. 5 and a transcatheter heart valve prosthesis during crimping thereof onto an inner shaft of a delivery system.
Figure 7:
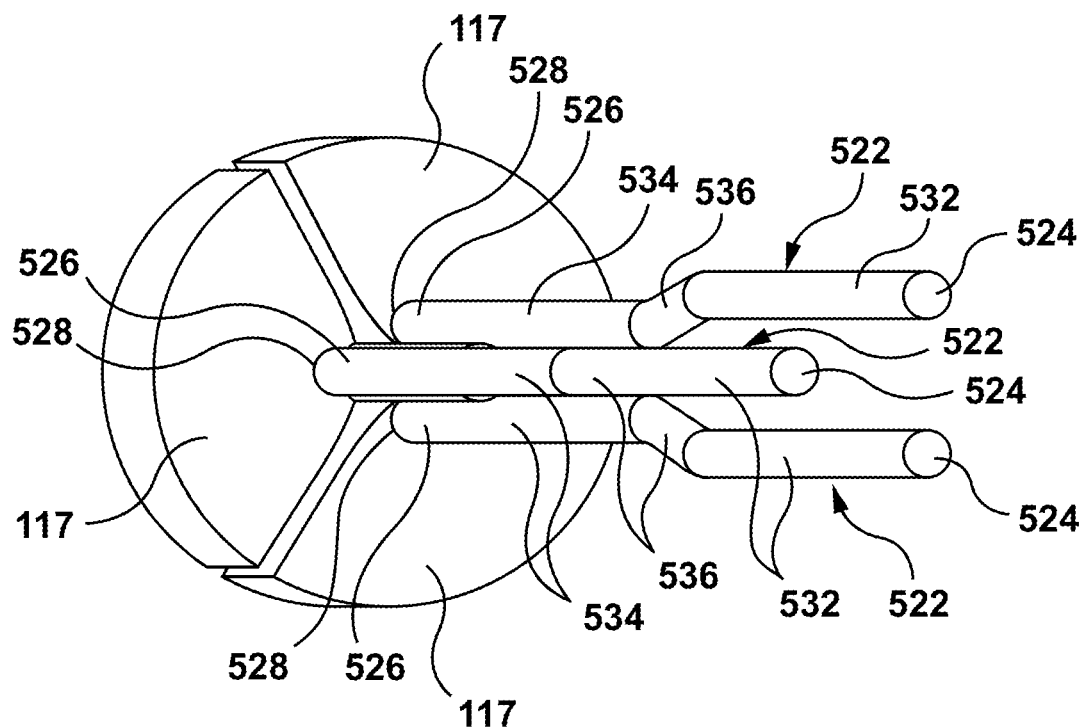
FIG. 7 depicts a perspective view of the relative positioning of the leaflet folding accessory of FIG. 5 and illustrative leaflets of a transcatheter heart valve prosthesis prior to crimping thereof.
Figure 8:
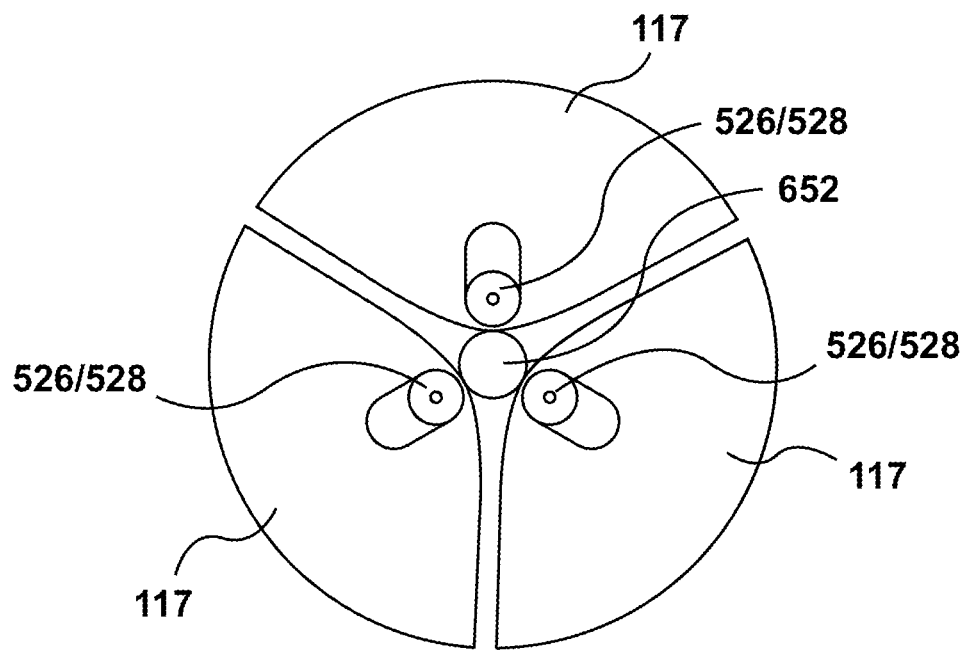
FIG. 8 depicts an end view of the relative positioning of the leaflet folding accessory of FIG. 5 and illustrative leaflets of a transcatheter heart valve prosthesis prior to crimping thereof.

More particularly, FIG. 5 depicts a side view of the leaflet folding accessory 520. FIG. 6 depicts a side view of the relative positioning of the leaflet folding accessory 520 and the transcatheter heart valve prosthesis 100 during crimping thereof onto the inner shaft 652 of the delivery system 650. FIGS. 7 and 8 depict a perspective view and an end view, respectively, of the relative positioning of the leaflet folding accessory 520 and the leaflets 117 of the transcatheter heart valve prosthesis 100 prior to crimping thereof. In FIGS. 7 and 8, the leaflets 117 of the prosthetic valve component 108 are shown removed from the valve support 102 of the stent 105 for illustrative purposes only.

The leaflet folding accessory 520 includes a plurality of guide fingers 522, each guide finger 522 having a first end 524 and a second end 526. As best shown in FIGS. 7 and 8, the second end 526 of each guide finger 522 is configured to contact the leaflets 117 of the transcatheter heart valve prosthesis 100 and hold the leaflets 117 of the transcatheter heart valve prosthesis 100 in a closed state against the inner shaft 652 of the delivery system 650 when the transcatheter valve prosthesis 100 is compressed into the crimped configuration. The guide fingers 522 are configured to contact the outer surfaces of the leaflets of the prosthetic valve component 108 to hold them in the closed state, in a radial position between the leaflets and the frame of the transcatheter heart valve prosthesis 100. As the transcatheter heart valve prosthesis 100 is crimped into a radially compressed configuration, the plurality of guide fingers 522 hold the leaflets 117 in the closed state against the inner shaft 652 of the delivery system 650 and prevent the leaflets from folding into an irregular pattern. By holding the leaflets 117 in the closed state, the leaflets 117 fold into a predetermined pattern during crimping of the transcatheter heart valve prosthesis 100 which prevents any leaflet damage and/or irregular folding patterns that adversely affect the delivery profile of the transcatheter heart valve prosthesis 100. More particularly, without leaflet folding accessory 520, the leaflets 117 may fold inwards at different rates and thereby result in folding into an irregular pattern. For example, a single leaflet 117 may drop or fold prior to the remaining leaflet(s) 117 and such an inconsistent sequence may result in crimping the initially folded leaflet 117 more than the other leaflet(s) 117. Such different folding rates of the leaflets 117 may result the initially folded leaflet 117 being damaged. However, when all the leaflets 117 are held in a defined pattern via the plurality of guide fingers 522, each leaflet 117 folds at a consistent rate and in a consistent pattern with each other leaflet 117, thereby allowing more packing of the leaflet material without damaging any leaflet. When holding the leaflets 117 in the closed state, the guide fingers 522 hold the free or unattached edges of the leaflets in a deeper position that is closer to the inflow end 101 of the valve support 102. More particularly, the guide fingers 522 are introduced into the outflow end 103 of the valve support 102 and extend through a substantial portion of the length of the valve support 102 in order to contact and hold the free edges of the leaflets which are closer to the inflow end 101 of the valve support 102. By holding the free edges of the leaflets 117 from the outflow end 103, the free edges are prevented from protruding through the outflow end 103 of the valve support 102 in the crimped configuration, as such protrusion may result in pinching damage.

In an embodiment, by holding the leaflets 117 in the closed state, the plurality of guide fingers 522 cause the leaflets 117 to fold into a predetermined pattern that includes alternating folds or pleats (i.e., infolds and outfolds). The predetermined pleated pattern of the leaflets 117 enables a smaller delivery profile or diameter of the transcatheter heart valve prosthesis 100 in the crimped configuration, and further the predetermined pleated pattern includes a controlled distribution of stresses and strains in the leaflets 117. The pleats or folds may be uniform in size and shape, or in another embodiment, the pleats may not be uniform in size and/or shape.

In an embodiment, each guide finger 522 is formed of a pliable polymer material. The polymer material of the plurality of guide fingers 522 must have sufficient stiffness to hold the leaflets 117 of the transcatheter heart valve prosthesis 100 in the closed state when the transcatheter valve prosthesis 100 is compressed into the crimped configuration, but must also be configured to contact the leaflets 117 of the transcatheter heart valve prosthesis 100 without causing damage thereto. Suitable polymer materials for the plurality of guide fingers 522 include but are not limited to ePTFE, polyurethane, or silicone. In another embodiment, each guide finger 522 is a composite finger comprised of a metal core for stiffness and a polymer layer or coating disposed over the metal core for friction modulation.

In an embodiment, the second end 526 of each guide finger 522 includes a semi-spherical or dome-shaped tip 528 that is configured to contact the leaflets 117 of the transcatheter heart valve prosthesis 100. The rounded geometry of the semi-spherical tip 528 ensures that the second end 526 of each guide finger 522 is atraumatic and configured to contact the leaflets 117 of the transcatheter heart valve prosthesis 100 without causing damage thereto. Further, the semi-spherical tip 528 may be formed from a softer material than the remaining length of the guide finger 522 to ensure atraumatic contact between the second end 526 of each guide finger 522 and the leaflets 117 of the transcatheter heart valve prosthesis 100. The semi-spherical tip 528 may alternatively be formed from a different material and/or include a coating of a different material than the remaining length of the guide finger 522 to enhance friction between the second end 526 of each guide finger 522 and the leaflets 117 of the transcatheter heart valve prosthesis 100. A material and/or coating that enhances friction between the second end 526 of each guide finger 522 and the leaflets 117 of the transcatheter heart valve prosthesis 100 assists in holding the leaflets 117 of the transcatheter heart valve prosthesis 100 in the closed state when the transcatheter valve prosthesis 100 is compressed into the crimped configuration. Suitable materials for the semi-spherical tip 528 of each guide finger 522 and/or coating that enhances friction between the second end 526 of each guide finger 522 and the leaflets 117 of the transcatheter heart valve prosthesis 100 include but are not limited to silicone, PTFE (polytetrafluorothylene), and polyurethane.

The plurality of guide fingers 522 are circumferentially spaced apart at substantially equal intervals. In an embodiment, the plurality of guide fingers 522 include at least three guide fingers and does not include more than nine guide fingers in order to ensure that the collective size of the plurality of guide fingers 522 is sufficiently small to permit withdrawal and removal of the guide fingers 522 after the transcatheter heart valve prosthesis 100 is crimped to a radially compressed configuration. As shown in the embodiment of FIGS. 5-8, the plurality of guide fingers 522 may include exactly three guide fingers 522, with each guide finger 522 being configured to contact a single leaflet 117 of the prosthetic valve component 108. It is advantageous for leaflet folding accessory 520 to minimize the number of guide fingers, i.e., by including a single guide finger to contact a single leaflet of the prosthetic valve component, in order to avoid the leaflet commissures 117A, 117B, 117C where adjoining pairs of leaflets are attached to each other. However, in another embodiment, the plurality of guide fingers 522 may include more than three guide fingers. For example, in an embodiment, the plurality of guide fingers 522 may include exactly six guide fingers 522, with two guide fingers 522 being configured to contact a single leaflet 117 of the prosthetic valve component 108. In an embodiment, the plurality of guide fingers 522 does not include more than nine guide fingers. Further, when configured for use with a prosthetic valve component 108 having single leaflet or bicuspid leaflet configuration, the number of guide fingers 522 configured to contact each leaflet may vary from the tricuspid leaflet configuration.

As shown in FIGS. 5 and 6, the leaflet folding accessory 520 includes a hub or handle 530 configured to be held by a user in order to position the leaflet folding accessory 520 as desired during the crimping process of the transcatheter heart valve prosthesis 100. The hub 530 includes a lumen 531 therethrough such that the leaflet folding accessory 520 may be advanced over and relative to the inner shaft 652 of the delivery system 650. The first end 524 of each guide finger 522 is attached to the hub 530. Each guide finger 522 includes a first portion 532 that extends from the hub 530 axially and substantially parallel to a longitudinal axis of the transcatheter valve prosthesis 100, a second portion 534 that extends axially and substantially parallel to the longitudinal axis of the transcatheter valve prosthesis 100, and a third portion 536 that extends between the first portion 532 and the second portion 534. The third portion 536 extends axially and radially inwards from the first portion 532 to the second portion 534. The first end 524 of each guide finger 522 is formed or defined at the attached end of the first portion 532 that is attached to and extends from the hub 530. The second end 526 of each guide finger 522 is formed or defined at the free or unattached end of the second portion 534. The angle of the third portion 536 is configured to dispose the second portion 534, and the second end 526 formed at the free or unattached end thereof, at a predetermined radial position so that the second end 526 of each guide finger 522 is configured to contact the leaflets 117 of the transcatheter heart valve prosthesis 100 and hold the leaflets 117 of the transcatheter heart valve prosthesis 100 in the closed state against the inner shaft 652 of the delivery system 650. Although the first, second, and third portions 532, 534, 536 are described separately herein for sake of describing the shape of the guide fingers 522, such portions may be integrally form a single guide finger or may be separate elements that are joined together to form a single guide finger.

Figure 9A:
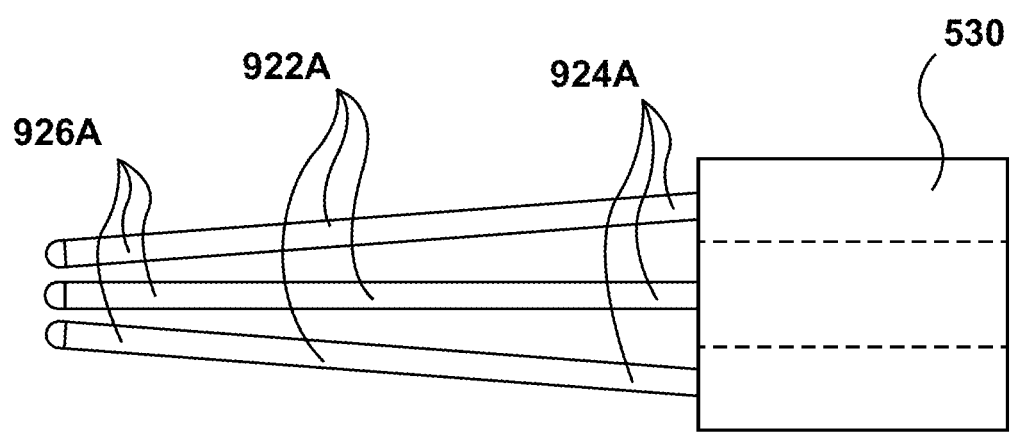
FIG. 9A depicts a side view of a leaflet folding accessory in accordance with another aspect of the disclosure.

Rather than each guide finger including the first, second, and third portions 532, 534, 536 as described above, in another embodiment shown in FIG. 9A, each guide finger 922A extends axially and radially inwards from the hub 530 along an entire length thereof. A first end 924A of each guide finger 922A is attached to the hub 530, and a second end 926A of each guide finger 922A is formed at the free or unattached end thereof. The angle of each guide finger 922A is configured to dispose the second end 926A at a predetermined radial position so that the second end 926A of each guide finger 922A is configured to contact the leaflets 117 of the transcatheter heart valve prosthesis 100 and hold the leaflets 117 of the transcatheter heart valve prosthesis 100 in the closed state against the inner shaft 652 of the delivery system 650.

Figure 9B:
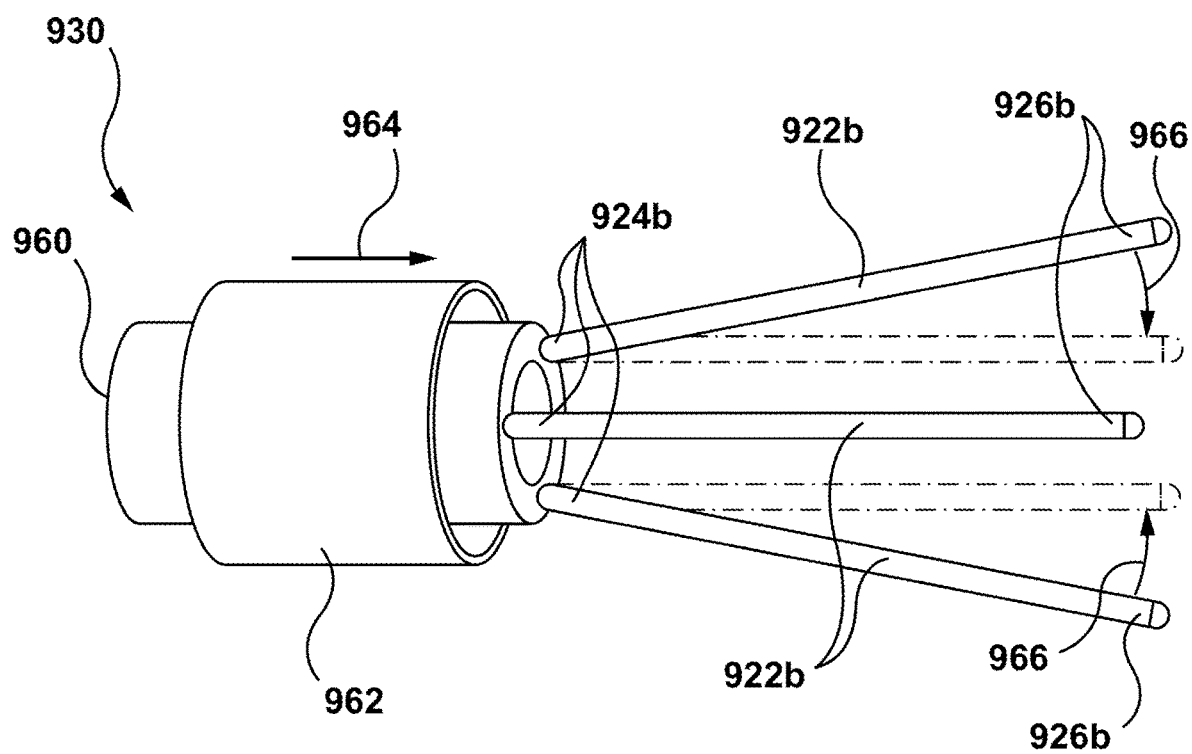
FIG. 9B depicts a side perspective view of a leaflet folding accessory in accordance with another aspect of the disclosure.

In another embodiment, each guide finger may extend axially and radially outwards from the hub and the hub may be configured to permit radial adjustment of the plurality of guide fingers to move them into the desired radial position. More particularly, the plurality of guide fingers may be configured to be positioned radially outward or spaced apart from the inner shaft 652 of the delivery system 650 for easy insertion into the transcatheter heart valve prosthesis 100, and then after the guide fingers are in the correct longitudinal position, the guide fingers may be moved radially inward to relocate and/or contact the leaflets 117 such that the guide fingers are positioned to hold the leaflets 117 in the closed state against the inner shaft 652 of the delivery system 650. More particularly, FIG. 9B illustrates a side perspective view of a hub 930 that includes an inner sleeve 960 and an outer sleeve or actuator 962 that surrounds the inner sleeve 960 and is slidable relative thereto. A plurality of guide fingers 922B are attached to and extend from the inner sleeve 960. In this embodiment, each guide finger 922B is configured to extend axially and radially outwards from the inner sleeve 960 along an entire length thereof. A first end 924B of each guide finger 922B is attached to the inner sleeve 960, and a second end 926B of each guide finger 922B is formed at the free or unattached end thereof. The outer sleeve or actuator 962 is moveable in a longitudinal direction indicated by directional arrow 964. When the outer sleeve 962 is advanced in a direction towards the guide fingers 922B by a user, the outer sleeve 962 is relocated to a position in which the outer sleeve 962 overlaps at least a portion of the guide fingers 922B and thereby causes the second ends 926B of the guide fingers 922B to deflect radially inwards as indicated by directional arrows 966. A user may further advance the outer sleeve 962 in a direction towards the guide fingers 922B to increase the amount of overlap between the outer sleeve 962 and the guide fingers 922B until the second ends 926B of the guide fingers 922B are disposed at a desired radial position, such that guide fingers 922B hold the leaflets 117 of the transcatheter heart valve prosthesis 100 in the closed state against the inner shaft 652 of the delivery system 650.

Figure 10:
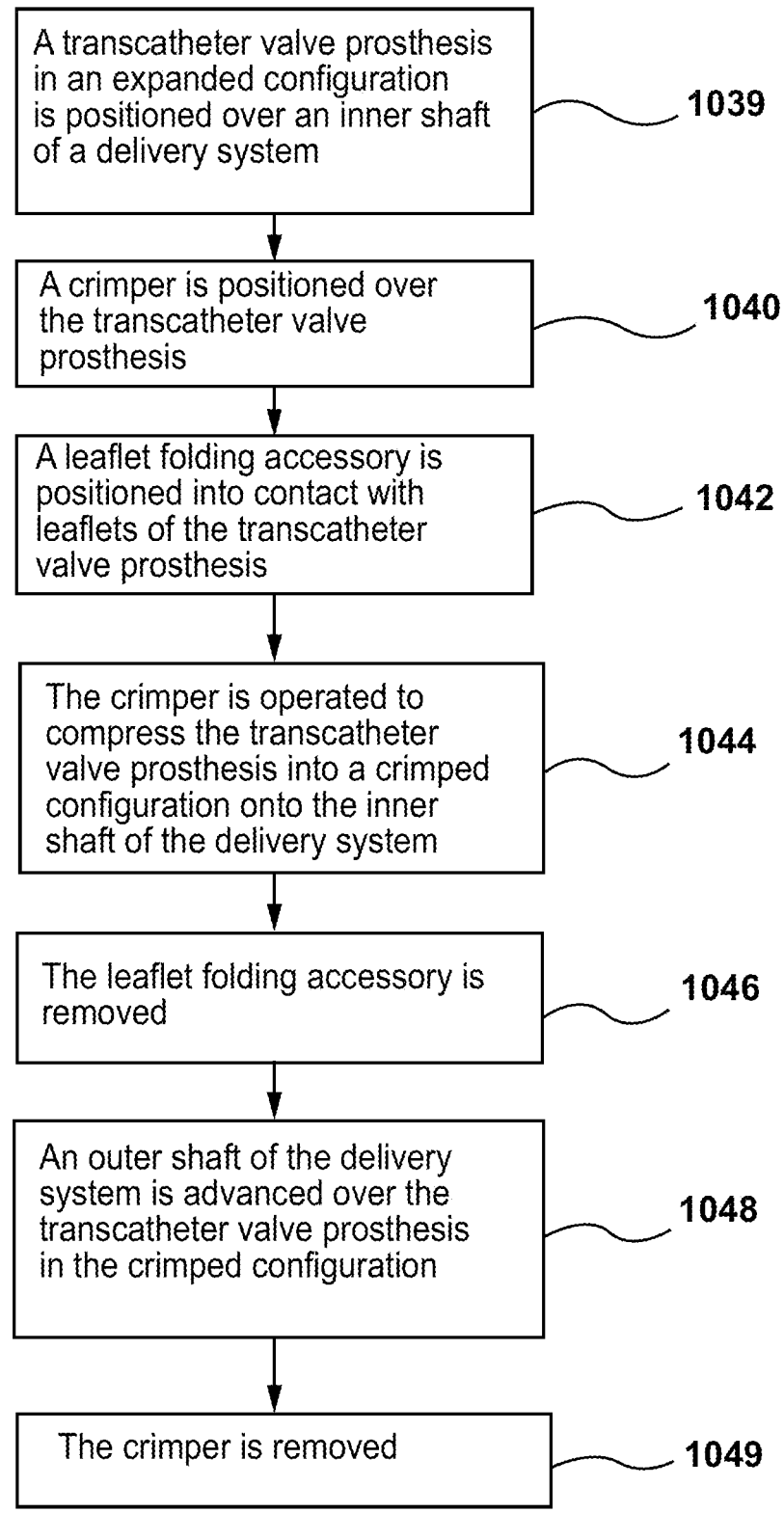
FIG. 10 depicts the method steps for using the leaflet folding accessory of FIG. 5 during crimping of a transcatheter heart valve prosthesis onto an inner shaft of a delivery system.
Figure 11:
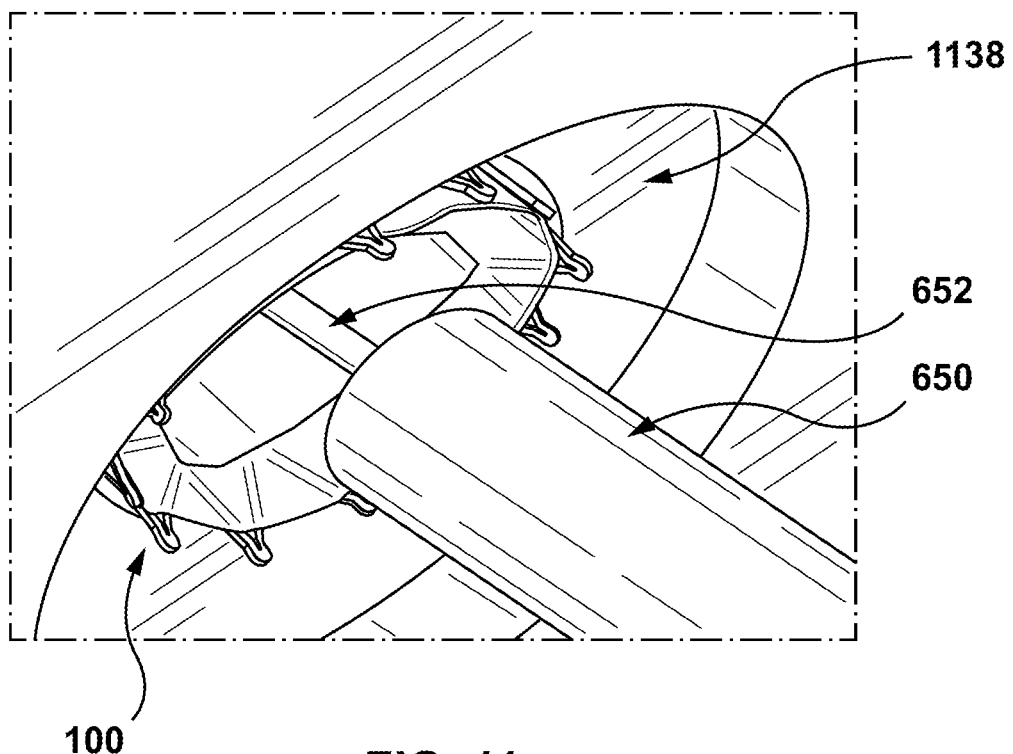
FIG. 11 depicts a method step of FIG. 10 in which a crimper is positioned over a transcatheter heart valve prosthesis in its expanded configuration over an inner shaft of a delivery system.

FIG. 10 depicts method steps according to an embodiment hereof for using the leaflet folding accessory 520 during crimping of a transcatheter heart valve prosthesis 100 onto the inner shaft 652 of the delivery system 650. With reference to step 1039 of FIG. 10, the transcatheter heart valve prosthesis 100 is in its expanded configuration and is over disposed the inner shaft 652 of the delivery system 650. With reference to step 1040 of FIG. 10, as well as FIG. 11, a crimper 1138 is positioned around the transcatheter heart valve prosthesis 100 such that the crimper 1138 circumferentially surrounds the transcatheter heart valve prosthesis 100 as shown in FIG. 11. The crimper 1138 may be any mechanical crimping device known in the art that is configured to radially compress the transcatheter heart valve prosthesis 100 from its expanded configuration to a radially compressed configuration suitable for intravascular delivery as known in the art. For example, the crimper 1138 may be a funnel crimper such as the crimper described in U.S. Pat. No. 9,414,914 to Duffy et al. which is herein incorporated by reference in its entirety, or may be an iris crimper as known in the art. In another embodiment, the crimper 1138 may be, for example, one of the crimpers described in U.S. Patent Appl. No. 63/000,079, herein incorporated by reference in its entirety.

Figure 12:
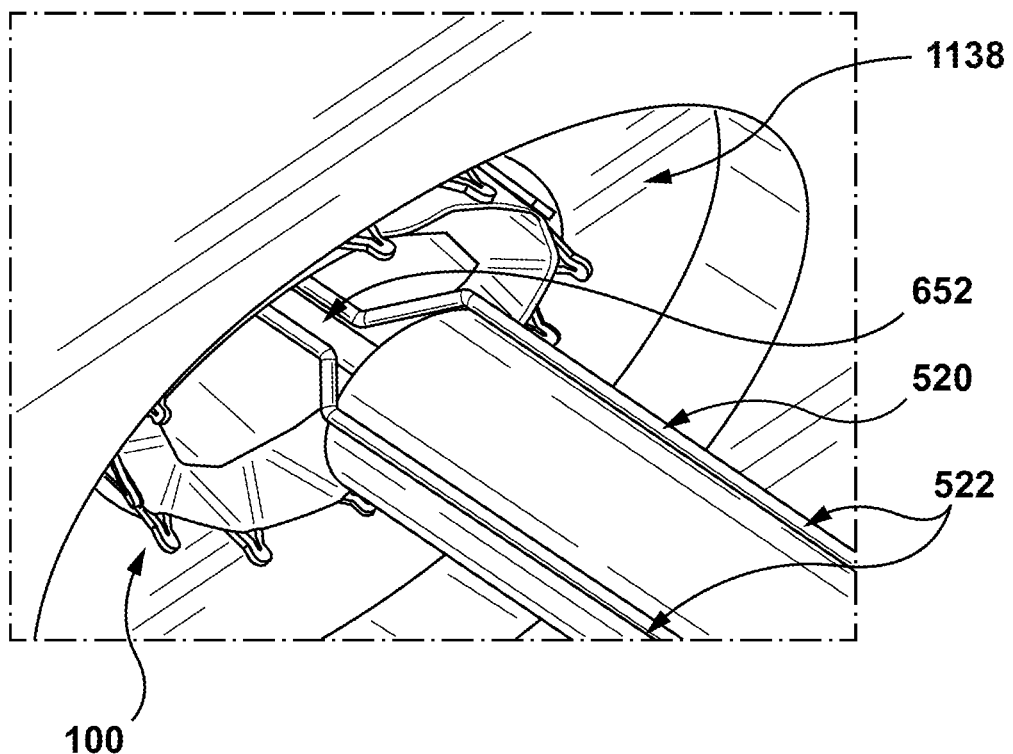
FIG. 12 depicts a method step of FIG. 10 in which the leaflet folding accessory of FIG. 5 is positioned onto leaflets of the transcatheter heart valve prosthesis.

With reference to step 1042 of FIG. 10, as well as FIG. 6 and FIG. 12, the leaflet folding accessory 520 is positioned at least partially within the transcatheter heart valve prosthesis 100 in its expanded configuration as shown in FIG. 12. As best shown in FIG. 6, in an embodiment, the plurality of guide fingers 522 of the leaflet folding accessory 520 are advanced into the outflow end 103 of the valve support 102. The plurality of guide fingers 522 of the leaflet folding accessory 520 are advanced until the second end 526 of each guide finger 522 contacts the leaflets 117 of the transcatheter heart valve prosthesis 100 and holds the leaflets 117 of the transcatheter heart valve prosthesis 100 in the closed state against the inner shaft 652 of the delivery system 650 (obscured from view in FIG. 12, but shown in FIGS. 7 and 8 described above). The outer surface of the free edges of the leaflets 117 are more accessible from the outflow end 103 of the valve support 102, as shown in FIGS. 2 and 4. Thus, the free edges of the leaflets 117 may be more easily held in the closed state against the inner shaft 652 of the delivery system 650 by the second ends 526 of the guide fingers 522 when the guide fingers 522 are advanced into the outflow end 103 of the valve support 102.

Figure 13:
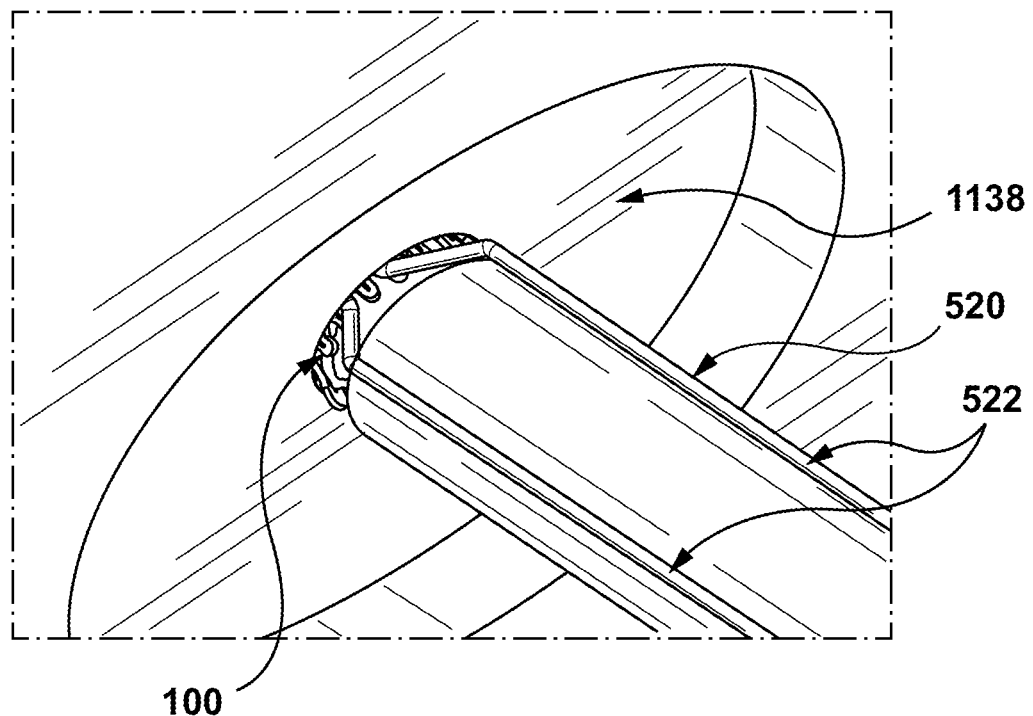
FIG. 13 depicts a method step of FIG. 10 in which the crimper is operated to compress the transcatheter heart valve prosthesis onto the inner shaft of the delivery system.

With reference to step 1044 of FIG. 10, as well as FIG. 13, the crimper 1138 is operated to radially compress the transcatheter heart valve prosthesis 100 onto the inner shaft 652 of the delivery system 650 as shown in FIG. 13. The crimper 1138 radially compresses the transcatheter heart valve prosthesis 100 into a crimped configuration suitable for delivery within a vasculature. During operation of the crimper 1138, the leaflet folding accessory 520 remains positioned or disposed at least partially within the transcatheter heart valve prosthesis 100, with the second end 526 of each guide finger 522 contacting and holding the leaflets 117 of the prosthetic valve component 108 of the transcatheter heart valve prosthesis 100 in the closed state against the inner shaft 652 of the delivery system 650 (obscured from view in FIG. 12, but shown in FIGS. 7 and 8 described above). As described above, by holding the leaflets 117 in the closed state, the leaflets 117 fold into a predetermined pattern during crimping of the transcatheter heart valve prosthesis 100 which prevents any leaflet damage and/or irregular folding patterns that adversely affect the delivery profile of the transcatheter heart valve prosthesis 100. The predetermined folded pattern of the leaflets 117 result in a smaller delivery profile or diameter of the transcatheter heart valve prosthesis 100 in the crimped configuration, and further the predetermined folded pattern includes a controlled distribution of stresses and strains in the leaflets 117 which minimizes the risk of leaflet damage.

Figure 14:
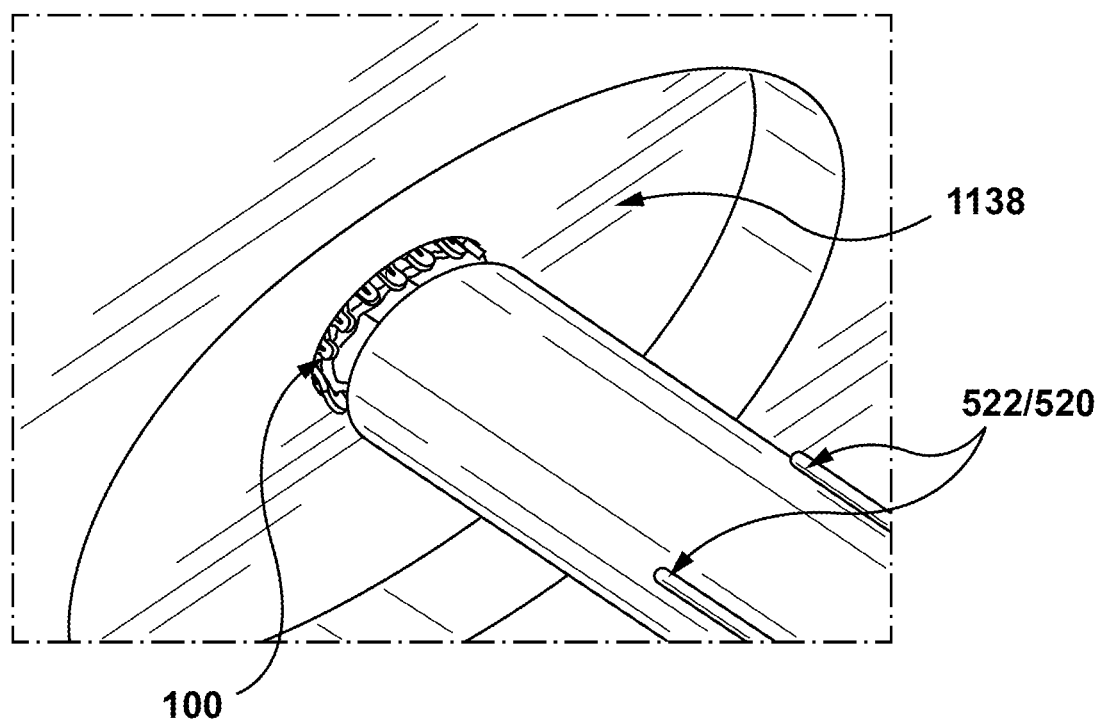
FIG. 14 depicts a method step of FIG. 10 in which the leaflet folding accessory of FIG. 5 is removed.

With reference to step 1046 of FIG. 10, as well as FIG. 14, the leaflet folding accessory 520 is withdrawn and removed from within the transcatheter valve prosthesis 100 after the crimper 1138 has been operated to radially compress the transcatheter heart valve prosthesis 100 into the crimped configuration. At this stage of the method, the crimper 1138 is still positioned over the radially compressed transcatheter heart valve prosthesis 100 as shown in FIG. 14. After removal of the leaflet folding accessory 520, the leaflets 117 remain folded in the predetermined pattern within the radially compressed transcatheter heart valve prosthesis 100.

Figure 15:
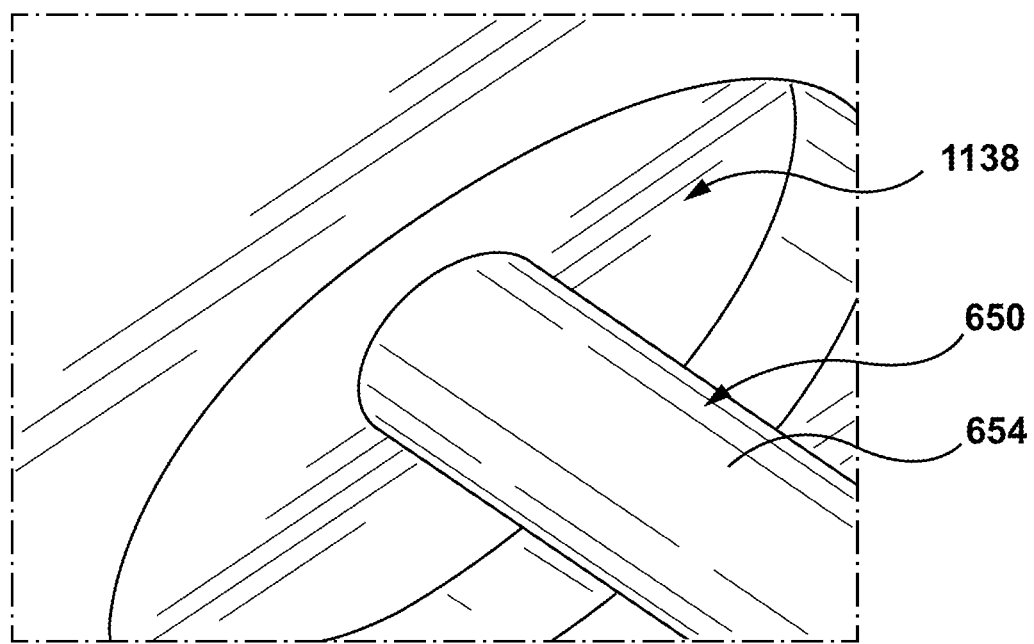
FIG. 15 depicts a method step of FIG. 10 in which an outer shaft of the delivery system is advanced within the crimper and over the compressed transcatheter heart valve prosthesis.

With reference to step 1048 of FIG. 10, as well as FIG. 15, an outer shaft 654 of the delivery system 650 is advanced within the crimper 1138 and over the radially compressed transcatheter heart valve prosthesis 100 after removal of the leaflet folding accessory 520 as shown in FIG. 15. The outer shaft 654 thus now constrains the transcatheter heart valve prosthesis 100 in its crimped configuration for delivery, and the crimper 1138 is removed at step 1049 of FIG. 10.

Another embodiment of a leaflet folding accessory according to an aspect of the disclosure is shown in FIGS. 16-19. A leaflet folding accessory 1620 is a mechanical guide or tool that is configured for use with a transcatheter valve prosthesis (such as but not limited to the transcatheter heart valve prosthesis 100) when radially compressing the transcatheter valve prosthesis into a crimped configuration for delivery within a vasculature. For illustrative purposes only, the leaflet folding accessory 1620 will be described for use with the transcatheter heart valve prosthesis 100 since the structure thereof has been described herein. The leaflet folding accessory 1620 is configured to hold the leaflets 117 of the prosthetic valve component 108 of the transcatheter heart valve prosthesis 100 in an open state during crimping. As used herein, "an open state" includes the leaflets being positioned such that at least a portion of each leaflet is directly adjacent to or against an inner surface of the stent of the transcatheter valve prosthesis, and if positioned in situ, the leaflets would be configured to allow blood flow through the central lumen of the stent.

Figure 16:
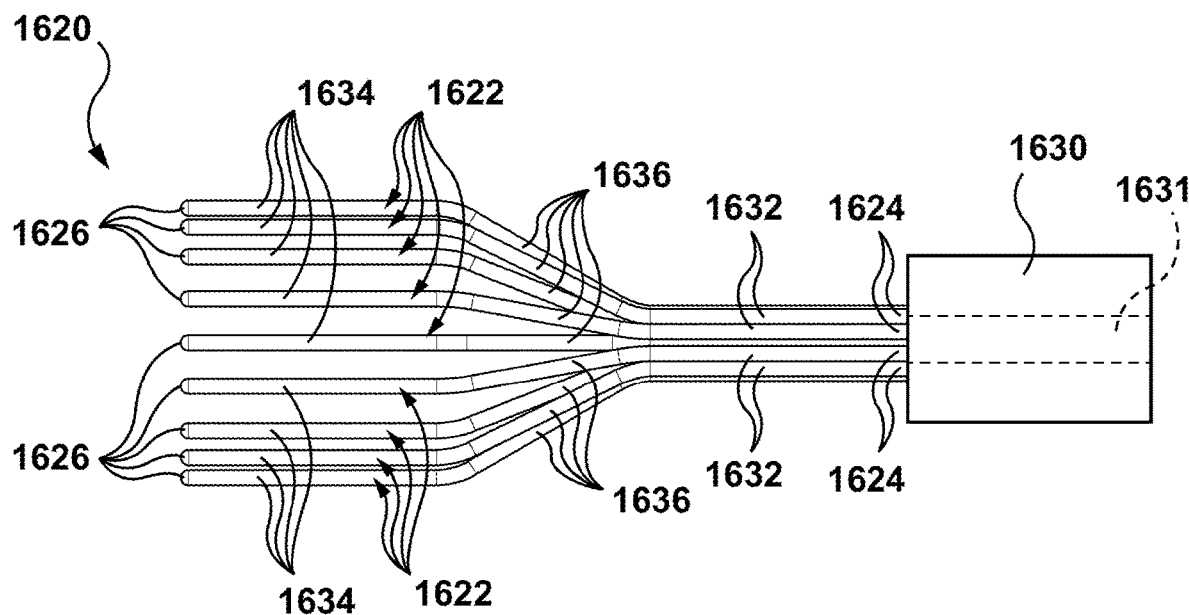
FIG. 16 depicts a side view of a leaflet folding accessory in accordance with another aspect of the disclosure.
Figure 17:
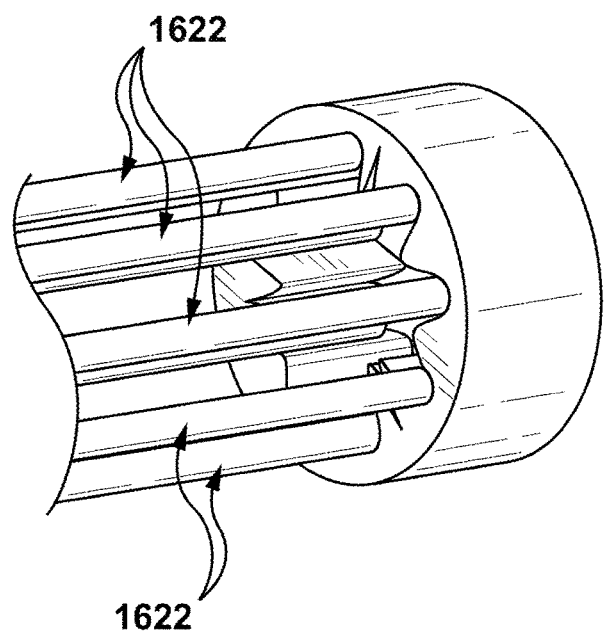
FIG. 17 depicts a perspective view of the relative positioning of the leaflet folding accessory of FIG. 16 and illustrative leaflets of a transcatheter heart valve prosthesis prior to crimping thereof.
Figure 18:
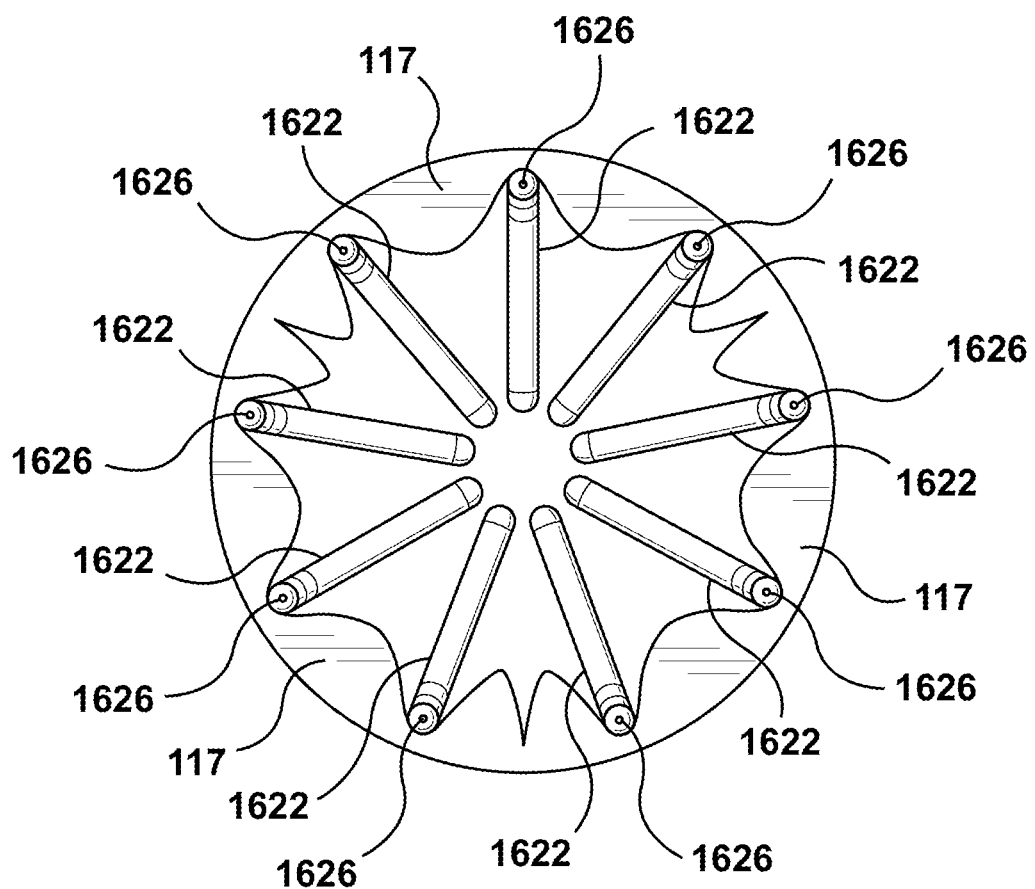
FIG. 18 depicts an end view of the relative positioning of the leaflet folding accessory of FIG. 16 and illustrative leaflets of a transcatheter heart valve prosthesis prior to crimping thereof.
Figure 19:
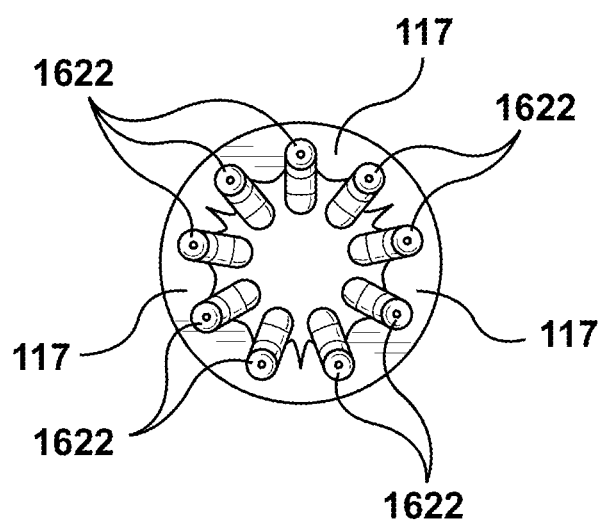
FIG. 19 depicts an end view of the relative positioning of the leaflet folding accessory of FIG. 16 and illustrative leaflets of a transcatheter heart valve prosthesis after crimping thereof.

More particularly, FIG. 16 depicts a side view of the leaflet folding accessory 1620. FIGS. 17 and 18 depict a perspective and an end view, respectively, of the relative positioning of the leaflet folding accessory 1620 and the leaflets 117 of the transcatheter heart valve prosthesis 100 prior to crimping thereof. FIG. 19 depicts an end view of the relative positioning of the leaflet folding accessory 1620 and the leaflets 117 of the transcatheter heart valve prosthesis 100 after crimping thereof. In FIGS. 17-19, the leaflets 117 of the prosthetic valve component 108 are shown removed from the valve support 102 of the stent 105 for illustrative purposes only.

The leaflet folding accessory 1620 includes a plurality of guide fingers 1622, each guide finger 1622 having a first end 1624 and a second end 1626. As best shown in FIGS. 17 and 18, each guide finger 1622 is configured to contact an inner surface of the prosthetic valve component 108 and hold at least a portion of the leaflets 117 of the transcatheter heart valve prosthesis 100 in the open state against an inner surface of the stent 105 of the transcatheter valve prosthesis 100 when the transcatheter valve prosthesis 100 is compressed into the crimped configuration. The guide fingers 1622 are configured to contact only the inner surfaces of the leaflets of the prosthetic valve component, rather than the outer surfaces of the leaflets. Stated another way, all of the guide fingers 1622 are radially disposed entirely within the leaflets of the prosthetic valve component 108 and are configured such that the guide fingers do not contact the outer surface of the leaflets. As the transcatheter heart valve prosthesis 100 is crimped into a radially compressed configuration, the plurality of guide fingers 1622 hold the leaflets 117 in the open state against an inner surface of the stent 105 of the transcatheter valve prosthesis 100 and prevent the leaflets from folding into an irregular pattern. By holding the leaflets 117 in the open state, the leaflets 117 fold into a predetermined pattern during crimping of the transcatheter heart valve prosthesis 100 which prevents any leaflet damage and/or irregular folding patterns that adversely affect the delivery profile of the transcatheter heart valve prosthesis 100. More particularly, without leaflet folding accessory 520, the leaflets 117 may fold inwards at different rates and thereby result in folding into an irregular pattern. For example, a single leaflet 117 may drop or fold prior to the remaining leaflet(s) 117 and such an inconsistent sequence may result in crimping the initially folded leaflet 117 more than the other leaflet(s) 117. Such different folding rates of the leaflets 117 may result the initially folded leaflet 117 being damaged. However, when all the leaflets 117 are held in a defined pattern via the plurality of guide fingers 522, each leaflet 117 folds at a consistent rate and in a consistent pattern with each other leaflet 117, thereby allowing more packing of the leaflet material without damaging any leaflet.

Figure 20:
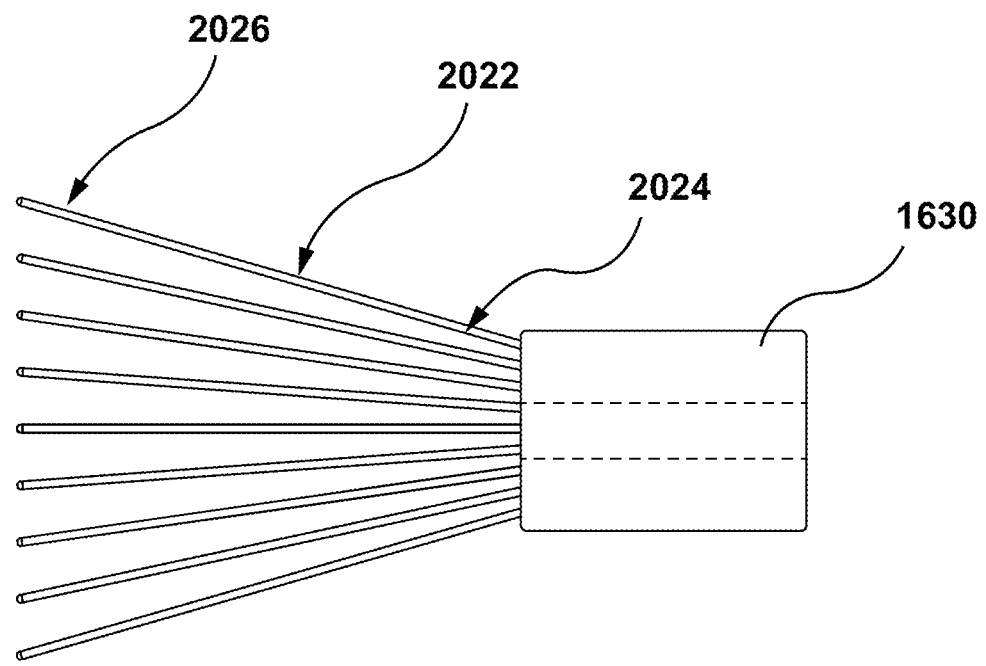
FIG. 20 depicts a side view of a leaflet folding accessory in accordance with another aspect of the disclosure.

In an embodiment, as shown in FIG. 20, as the transcatheter heart valve prosthesis 100 is crimped into a radially compressed configuration, the plurality of guide fingers 1622 cause the leaflets 117 to fold into a predetermined pattern that includes alternating folds or pleats (i.e., infolds and outfolds) that form around the plurality of guide fingers 1622 during crimping. The predetermined pleated pattern of the leaflets 117 enables a smaller delivery profile or diameter of the transcatheter heart valve prosthesis 100 in the crimped configuration, and further the predetermined pleated pattern includes a controlled distribution of stresses and strains in the leaflets 117. The pleats or folds may be uniform in size and shape, or in another embodiment, the pleats may not be uniform in size and/or shape.

Similar to guide fingers 522, each guide finger 1622 is formed of a pliable polymer material. The polymer material of the plurality of guide fingers 1622 must have sufficient stiffness to hold the leaflets 117 of the transcatheter heart valve prosthesis 100 in the open state when the transcatheter valve prosthesis 100 is compressed into the crimped configuration, but must also be configured to contact the leaflets 117 of the transcatheter heart valve prosthesis 100 without causing damage thereto. Suitable polymer materials for the plurality of guide fingers 1622 include but are not limited to ePTFE, polyurethane, or silicone. In another embodiment, each guide finger 1622 is a composite finger comprised of a metal core for stiffness and a polymer layer or coating disposed over the metal core for friction modulation.

The plurality of guide fingers 1622 are circumferentially spaced apart at substantially equal intervals. In an embodiment, the plurality of guide fingers 1622 include at least three guide fingers and does not include more than nine guide fingers in order to ensure that the collective size of the plurality of guide fingers 1622 is sufficiently small to permit withdrawal and removal of the guide fingers 522 after the transcatheter heart valve prosthesis 100 is crimped to a radially compressed configuration. As shown in the embodiment of FIGS. 16-20, the plurality of guide fingers 1622 may include exactly nine guide fingers 1622, with three guide fingers 1622 being configured to contact a single leaflet 117 of the prosthetic valve component 108. In another embodiment, the plurality of guide fingers 1622 may include less than nine guide fingers. For example, in an embodiment, the plurality of guide fingers 1622 may include exactly six guide fingers 1622, with two guide fingers 1622 being configured to contact a single leaflet 117 of the prosthetic valve component 108. In another embodiment, the plurality of guide fingers 1622 may include exactly three guide fingers 1622, with each guide finger 1622 being configured to contact a single leaflet 117 of the prosthetic valve component 108. Further, when configured for use with a prosthetic valve component 108 having single leaflet or bicuspid leaflet configuration, the number of guide fingers 1622 configured to contact each leaflet may vary from the tricuspid configuration.

As shown in FIGS. 16 and 17, the leaflet folding accessory 1620 includes a hub or handle 1630 configured to be held by a user in order to position the leaflet folding accessory 1620 as desired during the crimping process of the transcatheter heart valve prosthesis 100. The hub 1630 includes a lumen 1631 therethrough such that the leaflet folding accessory 1620 may be advanced over and relative to the inner shaft 652 of the delivery system 650. The first end 1624 of each guide finger 1622 is attached to the hub 1630. Each guide finger 1622 includes a first portion 1632 that extends from the hub 1630 axially and substantially parallel to a longitudinal axis of the transcatheter valve prosthesis 100, a second portion 1634 that extends axially and substantially parallel to the longitudinal axis of the transcatheter valve prosthesis 100, and a third portion 1636 that extends between the first portion 1632 and the second portion 1634. The third portion 1636 extends axially and radially outwards from the first portion 1632 to the second portion 1634. The first end 1624 of each guide finger 1622 is formed at the attached end of the first portion 1632 that is attached to and extends from the hub 1630. The second end 1626 of each guide finger 1622 is formed at the free or unattached end of the second portion 1634. The angle of the third portion 1636 is configured to dispose the second portion 1634 at a predetermined radial position so that the second portion 1634 of each guide finger 1622 is configured to contact the leaflets 117 of the transcatheter heart valve prosthesis 100 and hold the leaflets 117 of the transcatheter heart valve prosthesis 100 in the open state. Although the first, second, and third portions 1632, 1634, 1636 are described separately herein for sake of describing the configuration of the guide fingers 1622, such portions may be integrally form a single guide finger or may be separate elements that are joined together to form a single guide finger.

The leaflet folding accessory 1620 is used in a similar method as the leaflet folding accessory 520, as described in FIG. 10. However, when positioning the leaflet folding accessory 1620 at least partially within the transcatheter heart valve prosthesis 100 in its expanded configuration, the plurality of guide fingers 1622 of the leaflet folding accessory 1620 are advanced into the inflow end 101 of the valve support 102. The plurality of guide fingers 1622 of the leaflet folding accessory 1620 are advanced until each guide finger 1622 contacts the inner surfaces of the leaflets 117 of the transcatheter heart valve prosthesis 100 and holds the leaflets 117 of the transcatheter heart valve prosthesis 100 in the open state against an inner surface of the stent 105 of the transcatheter valve prosthesis 100. The inner surface and the full length or body of the leaflets 117 is more accessible from the inflow end 101 of the valve support 102, as shown in FIGS. 2 and 3. Thus, the leaflets 117 may be more easily held in the open state against an inner surface of the stent 105 of the transcatheter valve prosthesis 100 by the guide fingers 522 when the guide fingers 522 are advanced into the inflow end 101 of the valve support 102.

Rather than each guide finger including the first, second, and third portions 1632, 1634, 1636 as described above, in another embodiment shown in FIG. 20, each guide finger 2022 extends axially and radially outwards from the hub 1630 along an entire length thereof. A first end 2024 of each guide finger 2022 is attached to the hub 1630, and a second end 2026 of each guide finger 2022 is formed at the free or unattached end thereof. The angle of each guide finger 2022 is configured to dispose the second end [2126] 2026 at a predetermined radial position so that the second end [2126] 2026 of each guide finger [2122] 2022 is configured to contact the leaflets 117 of the transcatheter heart valve prosthesis 100 and hold the leaflets 117 of the transcatheter heart valve prosthesis 100 in the open state against an inner surface of the stent 105 of the transcatheter valve prosthesis 100. The guide fingers 2022 are configured to contact only the inner surfaces of the leaflets of the prosthetic valve component, rather than the outer surfaces of the leaflets. Stated another way, all of the guide fingers 2022 are radially disposed entirely within the leaflets of the prosthetic valve component 108 and are configured such that the guide fingers do not contact the outer surface of the leaflets.

Figure 21:
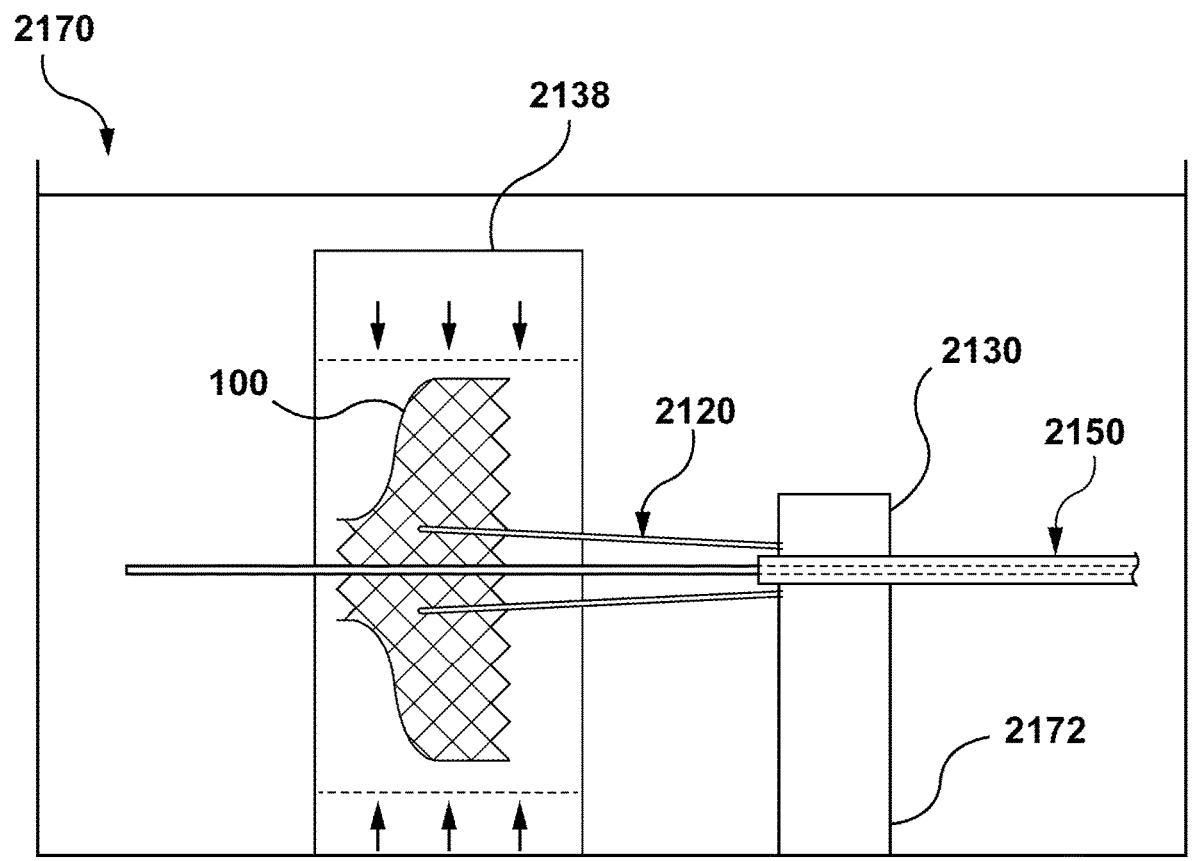
FIG. 21 depicts a top view of a leaflet folding accessory in accordance with another aspect of the disclosure, wherein a hub of the leaflet folding accessory is configured to attach to a loading tray.

In any embodiment hereof, the leaflet folding accessory 520, 1620 may be configured to connected to a loading tray such that the leaflet folding accessory remains in a fixed position relative to the loading tray during crimping of the transcatheter valve prosthesis 100, which would allow the guide fingers to be stabilized in a certain position without requiring the user to hold the hub of the leaflet folding accessory for a prolonged period of time. For example, as shown in FIG. 21, a hub 2130 of a leaflet folding accessory 2120 may be configured to attach to the loading tray 2170 via an extension 2172. The extension 2172 is an integral portion of the hub 2130 that is configured to attach to the loading tray 2170 via any suitable mechanical method known in the art. For example, the extension 2172 may attach to the loading tray 2170 via a clip, snap fit, friction fit, or other suitable connection means. Fixation of the leaflet folding accessory during crimping of the transcatheter valve prosthesis 100 onto a delivery system 2150 would permit the user to operate a crimper 2138 with both hands, instead of using one hand to hold the hub 2130 of the leaflet folding accessory.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

What is claimed is:

1. An assembly comprising:
a transcatheter valve prosthesis including a stent and a prosthetic valve component including at least one leaflet disposed within and secured to the stent, the transcatheter valve prosthesis having a crimped configuration for delivery within a vasculature and an expanded configuration for deployment within a native heart valve;
a leaflet folding accessory configured to be disposed at least partially within the transcatheter valve prosthesis when the transcatheter valve prosthesis is radially compressed into the crimped configuration via a crimper, wherein the leaflet folding accessory includes a hub and a plurality of guide fingers, each guide finger having a first end attached to the hub and a second end, the second end being configured to contact the prosthetic valve component and hold the at least one leaflet in a closed state against an inner shaft of a delivery system when the transcatheter valve prosthesis is in the expanded configuration prior to being radially compressed into the crimped configuration, and wherein each guide finger extends axially and radially inwards from the hub for at least a portion of a length of the guide finger, the length extending from the first end of the guide finger to the second end of the guide finger.

2. The assembly of claim 1, wherein the second end of each guide finger includes a semi-spherical tip that is configured to contact the prosthetic valve component.

3. The assembly of claim 1, wherein each guide finger is formed of a pliable polymer material.

4. The assembly of claim 3, wherein the second end of each guide finger includes a coating that increases friction between the second end and the prosthetic valve component.

5. The assembly of claim 4, wherein the coating is selected from silicone, PTFE, and polyurethane.

6. The assembly of claim 1, wherein the plurality of guide fingers include at least three guide fingers.

7. The assembly of claim 6, wherein the plurality of guide fingers do not include more than nine guide fingers.

8. The assembly of claim 6, wherein the plurality of guide fingers include exactly three guide fingers and the at least one leaflet includes exactly three leaflets, with each guide finger being configured to contact a single leaflet.

9. The assembly of claim 6, wherein the plurality of guide fingers are circumferentially spaced apart from each other at substantially equal intervals.

10. The assembly of claim 1, wherein the hub is configured to be held by a user.

11. The assembly of claim 10, wherein each guide finger extends axially and radially inwards from the hub along an entire length of the guide finger.

12. The assembly of claim 10, wherein each guide finger includes a first portion that extends from the hub axially and substantially parallel to a longitudinal axis of the transcatheter valve prosthesis, a second portion that extends axially and substantially parallel to the longitudinal axis of the transcatheter valve prosthesis, and a third portion that extends between the first portion and the second portion, the third portion extending axially and radially inwards from the first portion to the second portion.

13. The assembly of claim 10, wherein the hub is configured to attach to a loading tray.

14. A method of crimping a transcatheter valve prosthesis onto a delivery system, comprising:
- positioning a transcatheter valve prosthesis onto an inner shaft of a delivery system, the transcatheter valve prosthesis including a stent and a prosthetic valve component including at least one leaflet disposed within and secured to the stent, wherein the transcatheter valve prosthesis is in an expanded configuration;
- positioning a crimper over the transcatheter valve prosthesis in the expanded configuration;
- positioning a leaflet folding accessory at least partially within the transcatheter valve prosthesis prior to operating the crimper, the leaflet folding accessory including a plurality of guide fingers, each guide finger having a first end and a second end, wherein the leaflet folding accessory is positioned such that the second end of each guide finger contacts the prosthetic valve component and holds the at least one leaflet in a closed state against the inner shaft of the delivery system prior to operating the crimper when the transcatheter valve prosthesis is in the expanded configuration;
- operating the crimper to compress the transcatheter valve prosthesis into a crimped configuration for delivery within a vasculature, wherein the leaflet folding accessory remains positioned such that the second end of each guide finger contacts the prosthetic valve component and holds the at least one leaflet in the closed state against the inner shaft of the delivery system; and
- removing the leaflet folding accessory from within the transcatheter valve prosthesis.

15. The method of claim 14, further comprising:
- advancing an outer shaft of the delivery system over the transcatheter valve prosthesis in the crimped configuration after the step of removing the leaflet folding accessory; and
- removing the crimper.

* * * * *